(12) United States Patent
Johnson

(10) Patent No.: US 12,416,481 B1
(45) Date of Patent: Sep. 16, 2025

(54) CONSTRUCTION MARKING DEVICE

(71) Applicant: Cody Johnson, San Diego, CA (US)

(72) Inventor: Cody Johnson, San Diego, CA (US)

(*) Notice: Subject to any disclaimer, the term of this patent is extended or adjusted under 35 U.S.C. 154(b) by 0 days.

(21) Appl. No.: 19/080,588

(22) Filed: Mar. 14, 2025

Related U.S. Application Data

(60) Provisional application No. 63/565,237, filed on Mar. 14, 2024.

(51) Int. Cl.
*G01B 3/10* (2020.01)
*G01B 3/1056* (2020.01)
*G01B 3/1089* (2020.01)

(52) U.S. Cl.
CPC ......... *G01B 3/1089* (2020.01); *G01B 3/1056* (2013.01)

(58) Field of Classification Search
CPC .............................. G01B 3/1056; G01B 3/1089
USPC ..................................................... 33/760, 770
See application file for complete search history.

(56) References Cited

U.S. PATENT DOCUMENTS

| | | | | |
|---|---|---|---|---|
| 3,731,389 A * | 5/1973 | King | ...................... | B43K 29/08 33/767 |
| 4,667,412 A * | 5/1987 | Carlson | ................ | G01B 3/1084 33/666 |
| 5,402,583 A * | 4/1995 | Komura | ................ | G01B 3/1056 33/758 |
| 5,421,100 A * | 6/1995 | Leore | .................... | G01B 3/1071 33/759 |
| 5,845,412 A * | 12/1998 | Arcand | ................ | G01B 3/1056 33/770 |
| 6,763,603 B2 * | 7/2004 | Carrabino | ................ | B25H 7/04 33/668 |
| 6,910,280 B2 * | 6/2005 | Scarborough | ........ | G01B 3/1084 33/768 |
| 6,996,915 B2 * | 2/2006 | Ricalde | ................ | G01B 3/1071 33/768 |
| 7,475,492 B1 * | 1/2009 | Huang | ................ | G01B 3/1056 33/DIG. 1 |
| 7,490,415 B1 * | 2/2009 | Cubbedge | ............ | G01B 3/1084 33/770 |
| 8,464,436 B2 * | 6/2013 | Smith | .................. | G01B 3/1005 33/760 |
| 9,074,859 B1 * | 7/2015 | Dever | .................. | G01B 3/1084 |
| 9,163,918 B2 * | 10/2015 | Ricalde | ................ | G01B 3/1041 |
| 9,335,142 B2 | 5/2016 | DeMartinis et al. | | |
| 9,410,785 B1 * | 8/2016 | Deutscher | ............ | G01B 3/1056 |
| 9,574,862 B2 * | 2/2017 | McCallum | ........... | G01B 3/1005 |
| 9,982,984 B2 * | 5/2018 | Feeney | ................ | G01B 3/1056 |
| 11,920,777 B1 * | 3/2024 | Stenta | .................. | G01B 3/1092 |
| 2003/0159304 A1 | 8/2003 | Black | | |
| 2006/0196072 A1 * | 9/2006 | Lewis | .................. | G01B 3/1084 33/760 |
| 2009/0178291 A1 * | 7/2009 | Huang | ................ | G01B 3/1056 33/758 |

(Continued)

*Primary Examiner* — George B Bennett
(74) *Attorney, Agent, or Firm* — Knobbe, Martens, Olson & Bear, LLP

(57) ABSTRACT

A marking tool configured to selectively couple to a tape measure may include a magnet, and an applicator comprising a marking surface for producing a mark of defined size and shape, the applicator configured to carry a colorant. A marking tool may include a coupling component attached to the applicator, wherein the coupling component comprises a cavity sized and shaped to receive the magnet; and a recess sized and shaped to receive a portion of a tape measure including a metal hook of the tape measure.

20 Claims, 17 Drawing Sheets

(56) References Cited

U.S. PATENT DOCUMENTS

| | | | |
|---|---|---|---|
| 2009/0249636 A1* | 10/2009 | Reda .................... | G01B 3/1084 33/760 |
| 2014/0165414 A1* | 6/2014 | Smith .................. | G01B 3/1056 33/768 |
| 2017/0167842 A1 | 6/2017 | Feeney | |
| 2020/0025546 A1 | 1/2020 | Henderson et al. | |

* cited by examiner

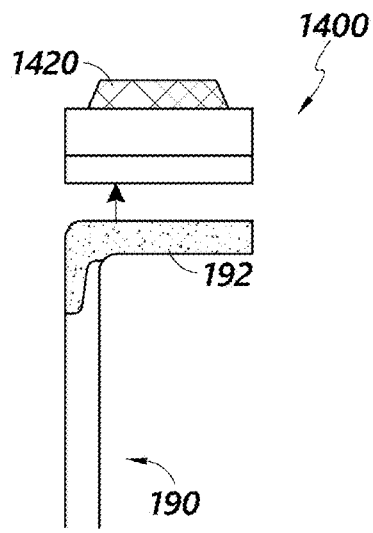
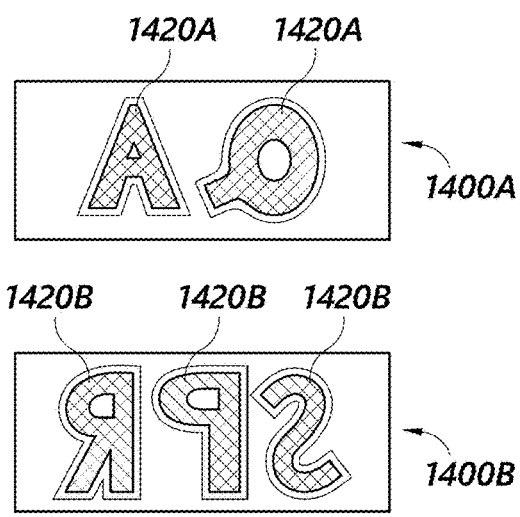
FIG. 14A    FIG. 14B
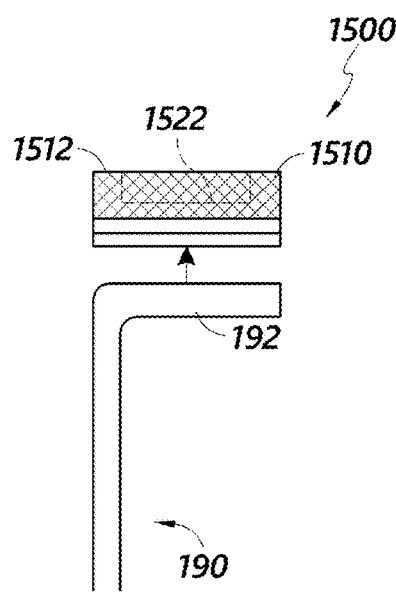
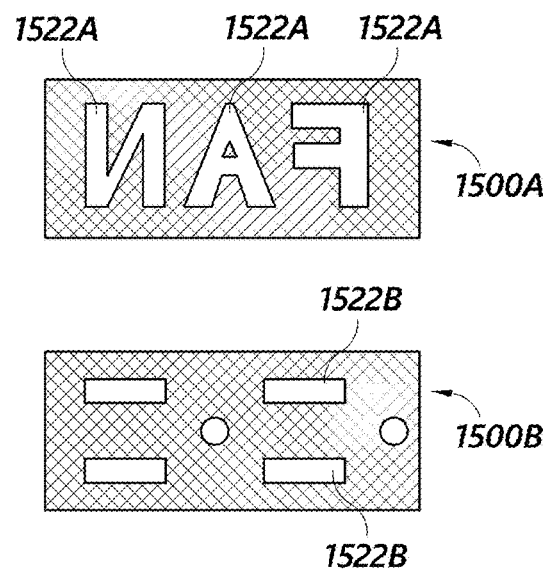
FIG. 15A    FIG. 15B

CONSTRUCTION MARKING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority of U.S. Provisional Patent Application No. 63/565,237, filed Mar. 14, 2024, the entire contents of which are hereby incorporated by reference.

BACKGROUND

This disclosure relates generally to marking tools, and more particularly for marking tools for use in construction.

SUMMARY

One aspect of the present disclosure relates to a stamping tool configured to selectively couple to a tape measure, including: a magnet; an applicator including a stamping surface for producing a mark of defined size and shape, the applicator configured to carry a colorant. The stamping tool also includes a coupling component attached to the applicator, wherein the coupling component includes: a magnet cavity sized and shaped to receive the magnet; and a recess sized and shaped to receive a portion of a tape measure including a metal hook of the tape measure; and a cover sized and shaped to substantially cover the magnet cavity and hold the magnet in place. The magnet cavity is disposed sufficiently close to the recess such that a magnetic field of the magnet interacts with the metal hook and/or a metal tang of the tape measure, and selectively couples the stamping tool with the tape measure when the portion of the tape measure is received in the recess of the coupling component; and wherein the stamping tool has an extension axis in the direction of the extension of the tape measure tape when the stamping tool is coupled to the tape measure, and the stamping tool has a concave axis in the direction of convexity of the tape measure tape, perpendicular to the extension axis, when the stamping tool is coupled to the tape measure.

In another aspect, a stamping tool configured to selectively couple to a tape measure, comprising a coupling component comprising: a body; a cavity disposed within the body; a recess adapted to receive a hook portion of a tape measure; a magnet disposed within the cavity, wherein the magnetic field of the magnet is configured to interact with the hook portion of the tape measure when the hook portion of the tape measure is inserted in the recess; an applicator comprising a marking surface, the applicator configured to carry a colorant, the applicator adapted to make a mark on a surface at a distance from the tape measure when the tape measure is at least partially extended; and wherein the stamping tool has an extension axis in the direction of the extension of the tape measure tape when the stamping tool is coupled to the tape measure, and the stamping tool has a concave axis in the direction of convexity of the tape measure tape, perpendicular to the extension axis, when the stamping tool is coupled to the tape measure.

The stamping tool may include a hook recess in the shape of a slot, and is sized and shaped to receive the metal hook of a tape measure. The recess of the stamping tool may further include a tape recess with the concave shape of the tape measure tape, the tape recess sized and shaped to receive a portion of the tape of the tape measure, and wherein the tape recess includes an opening in a bottom surface of the coupling component, the bottom surface facing the direction opposite the extension axis.

The coupling component may include a rear surface facing the direction of the concave axis, the rear surface including the recess. The stamping surface of the applicator may face substantially parallel to the extension axis, or the stamping surface of the applicator may be angled at 10° to 45° relative to the extension axis of the tape measure tape. The stamping tool may include a center mark placed at or near a center plane of the stamping tool, and offset marks placed at an offset from the center plane of the stamping tool.

The center mark and offset marks may be placed on a front surface of the coupling component, the front surface facing the direction opposite to the concave axis. The magnet cavity may open to the bottom surface of the coupling component, the bottom surface facing the direction opposite the extension axis. The magnet cavity may open to a top surface of the coupling component, the top surface facing the direction of the extension axis, and the applicator covers the magnet cavity.

The stamping tool may include a rear edge farthest along the concave axis, and wherein the rear edge does not substantially project past edges of the tape of the tape measure along the concave axis when the stamping tool is coupled with a tape measure. The stamping tool may include a rear edge farthest along the concave axis, and wherein the rear edge substantially projects past edges of the tape of the tape measure along the concave axis when the stamping tool is coupled with a tape measure.

The magnet may have an elongated bar shape with an elongated direction, and the magnet cavity orients the magnet such that the elongated direction is perpendicular to both the extension axis and the concave axis.

The magnet may have an elongated bar shape with an elongated direction, and the magnet cavity orients the magnet such that the elongated direction is parallel to the concave axis and perpendicular to the extension axis.

The stamping tool may include: an engagement feature disposed on the coupling component; a stamp cover sized and shaped to shield at least a portion of the stamping tool including the applicator, the stamp cover including a corresponding engagement feature configured to selectively couple to the engagement feature disposed on the coupling component and maintain the stamp cove in place shielding the portion of the stamping tool.

The stamping tool may include a pointed marking surface disposed along the concave axis, configured to produce a mark of variable size and shape depending on the force between marking surface and another surface which it contacts. The stamping surface may be shaped to imprint a stamp mark including a message such as a letter, symbol, or word.

The magnet cavity of the stamping tool may be in communication with the recess, and the magnet further includes a tab projecting toward the recess, the tab sized and shaped to be received by a hook slot in the metal hook of the tape measure when the stamping tool is coupled to the tape measure.

A second aspect of the present disclosure relates to a stamping tool, including: an applicator; and a magnet affixed to the applicator configured to selectively couple the stamping tool to a hook of a tape measure.

A third aspect of the present disclosure relates to a method for leaving a stamp at a distant surface, the method including: identifying a need for a stamp at a distant surface;

attaching a stamping tool including an applicator and a magnet to the hook of a tape measure; applying colorant to the applicator; extending the tape measure to reach the distant surface; and moving the tape measure to press the applicator to the distant surface and leave a stamp.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are not to be considered limiting of its scope.

FIG. 14A is a side view of an example embodiment of a stamping tool with raised lettering.

FIG. 14B is a top view of two example embodiments of stamping tools with raised lettering.

FIG. 15A is a side view of an example embodiment of a stamping tool with sunken lettering.

FIG. 15B is a top view of two example embodiments of stamping tools with sunken lettering.

DETAILED DESCRIPTION

Figure 1:
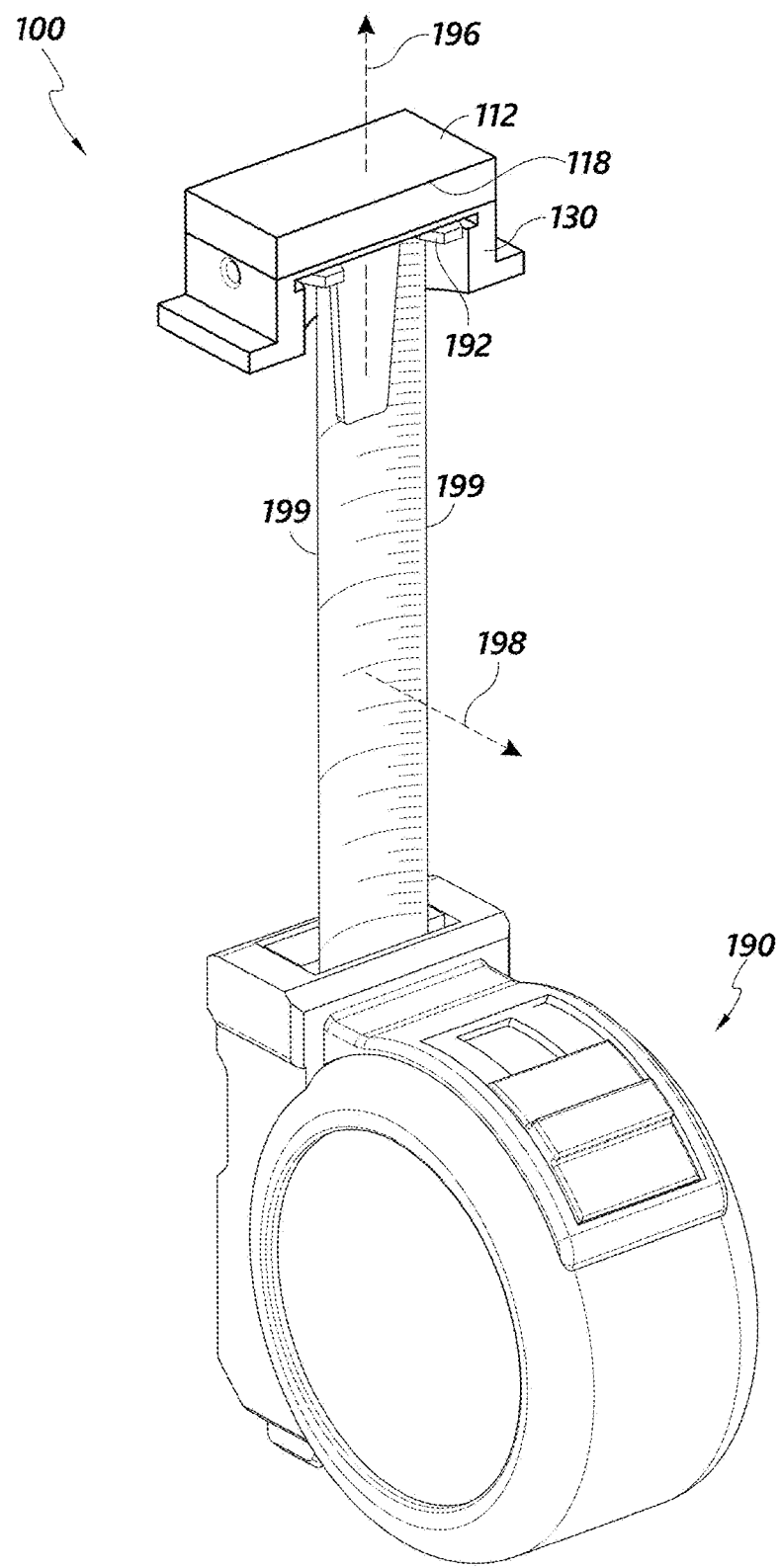
FIG. 1 is a perspective view of an example embodiment of a stamping tool attached to a tape measure.

The foregoing and other aspects of the present disclosure will now be described in more detail with respect to the description and methodologies provided herein. This description is not intended to be a detailed catalogue of all the ways in which the embodiments of the present disclosure may be implemented, or of all the features that may be added to the present disclosure. For example, features illustrated with respect to one embodiment may be incorporated into other embodiments, and features illustrated with respect to a particular embodiment may be deleted from that embodiment. In addition, numerous variations and additions to the various embodiments suggested herein, which do not depart from the instant disclosure, will be apparent to those skilled in the art in light of the instant detailed description, figures, and claims. Hence, the following specification is intended to illustrate some particular embodiments, and not to exhaustively specify all permutations, combinations, and variations thereof.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Building construction is a collaborative effort that requires the expertise of workers from several different trades and coordination from a construction manager or general contractor. For any particular construction project, the efforts of such experts as carpenters, framers, electricians, plumbers, and others must be joined together to erect the building as planned. However, the different trades may not be able to work on the same building at the same time. For example, an electrician's work may be best accomplished after the framers have completed their work, such that the electrician can run their wires along the framing. That same electrician's tasks should be at least partially completed before a drywaller boards up the wall, denying access to the framing. Thus, the timing of each trade's efforts will be scheduled by the construction manager on a construction schedule chart indicating the order and dates of work.

The asynchronous work of different trades on the same building construction can compound communication difficulties common to the industry. Though the construction manager delivers instructions and building plans to each trade, these instructions and building plans can be difficult to reference while working on-site, or changes may arise during the construction process. In some cases, a plan may need to be altered in order to satisfy a building code, safety regulation, city ordinance, to correct an inspector's finding, or the like. In many cases, the different trades involved will have different supervisors or employers, with each trade working as independent contractors. As the different trades may not share the same employer, may not work on-site at the same time, and may have difficulty referencing the master plan and schedule while working, communication problems between trades are common and costly. Every mistake can slow the progress of construction, impeding the future steps that depend on timely completion of the present ones. In current construction methods, a trade supervisor or subcontractor can leave notes for how one trade can complete its task, but does not communicate with other trades or subcontractors on how to complete their work. The notes from one trade may conflict with what the other trades are trying to or need to do.

Because inter-trade communication is both important and difficult or another tradesman may leave notes or marks to themselves or each other on the elements of construction that will be concealed by finishing materials upon completion. The marks may indicate that the quality of the work passes quality control, locate designated spots for installing vents and outlets, boxes, fixtures, and the like, or warn of hidden dangers or components to be protected such as wires or pipes. For example, a construction manager may leave pencil marks on a vertical frame to remind the electrician where an electrical box is to be installed, or spray paint a mark on a subfloor where an HVAC professional should cut for a heating vent. In both cases, the marks indicate and helpfully remind the tradesmen of the correct position for their work. This momentary effort by the person communicating through these markings can save tradesmen from confusion and mistakes, without the need for the marking person and the tradesmen to be in direct communication.

However, not all locations to are equally easy to mark. For example, marking ceiling joists could be useful for describing light fixture placements. However, the average ceiling height in the United States is about nine feet and for commercial construction, ceiling heights can stretch to ten to twelve feet or even higher in some cases. In stairwells or in other rooms or places, walls and ceilings may be positioned much higher. With an average standing reach of just seven feet, a worker marking ceiling joists or locations high on walls to designate installation locations or indicating quality control and/or inspector approval may be unable to easily reach the ceiling joists and be left with several unappealing options. That worker may be required to procure and move a ladder to reach each high location, such as a ceiling joist, carry a cumbersome and uncommonly long marking instrument, or resort to marking the floor below the location. Moving and using a ladder to mark high locations is inconvenient and brings common risks of the worker falling off the ladder or denting construction elements with the ladder. Areas with complex floor designs, such as the ceiling above a stairwell, areas of unstable or uneven ground, can be unsafe to reach even with a ladder. Marking the floor below the ceiling location is a commonly used solution to this marking problem, but the marks left on the ground or the floor for tradesmen working on the ceiling are less visible and easier to miss and may be soon covered by flooring or erased by the footprints of dirty boots, or scattered around as dirt or the ground is disturbed by the construction activity. Similarly, locations high on a wall, low below a floor or far from the edge of a safe area for standing may be difficult to mark.

Using systems and methods described herein can provide accurate instructions and location indications, increase communication between trades, streamline construction efficiency, and improve safety. By using systems and methods described herein, the number of trade walks made by tradesmen, contractors, or subcontractors can be reduced.

Improved tools and methods for marking buildings in construction could greatly benefit other stakeholders involved with a site. For example, building inspectors, employed by the construction company or a municipality, are tasked with ensuring that the construction standards satisfy a building code of regulations. Typically, when a building inspector assesses that a correction is needed, they will issue a construction notice for the project. However, this construction notice may be difficult to interpret for both the tradesman tasked with the correction and a different building inspector assessing whether the correction was performed to satisfaction. If marking hard-to-reach locations in a construction project were convenient, the building inspector could quickly and effectively communicate problems and indicate the required solutions by marking or stamping the locations where a correction is required and action needed. If the construction manager fails to ensure the required correction is made, then the mark preserves the issue. Spaces that meet building code standards to the building inspector's satisfaction could be quickly marked as already-inspected if marking construction locations were more convenient.

Thus, a tool and method of use that solve these problems are desired. The present disclosure describes, in at least one aspect, a stamping tool that is removably attached to the hook or tongue of a common or standard tape measure. The stamping tool may comprise an applicator for absorbing a colorant, a magnet for selective attachment to the tape measure hook, and a coupling component connecting the sponge with the magnet.

The construction worker, contractor, inspector, or supervisor employing the stamping tool can attach the stamping tool to a tape measure, apply colorant to the applicator and extend out the tape from the tape measure to an appropriate length to reach the location to be marked. Then, the construction worker touches the applicator with colorant on it to the location, leaving a mark. The distance between the worker and the stamping tool can be easily adjusted for marking locations of various distances by feeding out or spooling in the tape measure tape. In some embodiments, the stamping tool is configured to imprint a message such as letter, symbol, or word. The construction worker can carry several stamping tools with different messages, exchanging them when needed. Because the stamping tools employ a common tape measure for added reach rather than having an elongated structure, the stamping tools can be relatively small for storage in a worker's toolbelt. As many construction workers carry a tape measure anyway, the stamping tool adds minimal bulk or weight to the workers' toolsets, while saving the workers the hassle of fetching a ladder for placing marks in difficult locations. A contractor may carry a first stamping tool having a first letter, symbol, or message indicative of the responsibilities and requests of the contractor, whereas an inspector may have a second stamping tool having a second letter, symbol, or message, indicative of the responsibilities of the inspector.

The stamping tools and methods of use disclosed can decrease the need for workers to climb ladders or perform other dangerous maneuvers to mark distant construction elements, increasing worker safety. The stamping tools and methods of use disclosed can also greatly increase worker safety by increasing communication in building construction, thus reducing costly mistakes that can be dangerous and time-consuming to correct. By reducing construction mistakes, the stamping tools and methods of use may also protect the public that use and rely on constructed buildings. Although the description describes a stamping tool in some embodiments, one of skill would understand that the stamping tool could be adapted to be a marking tool for making marks other than a stamp.

FIG. 1 illustrates an example embodiment of a stamping tool 100 wherein the stamping tool 100 is attached to a tape measure 190. The stamping tool 100 comprises applicator 110, coupling component 130, and a magnet (not shown in FIG. 1).

Applicator 100 includes stamping surface 112, which in some embodiments may have a rear edge 118. Applicator 100 is configured to carry a colorant, such as paint, ink, chalk, and the like and to transfer a portion of the colorant from the stamping surface 112 onto another surface such as a joist, stud, ceiling, etc. with which the stamping surface 112 comes into contact. Upon contact with another surface, applicator 110 releases some of the colorant it carries to leave a mark, such as a stamp. In some embodiments, Applicator 110 may comprise a rubber, a sponge, or a foam-like material that is soft and porous to absorb colorant. These qualities allow applicator 110 to decrease in volume when squeezed and apply a liquid colorant, and to increase in volume when released to absorb a liquid colorant. In some embodiments, the applicator 110 can be self-inking or self-marking such that the applicator need not be dipped in or absorb colorant just prior to making a mark.

Stamping surface 112 is at least partially planar for producing a stamp mark of defined size and shape when stamping surface 112 contacts another surface and applicator 1110 is squeezed and deformed. For example, stamping surface 112 may form a letter, word, or symbol, or comprise raised or sunken portions such that a stamp mark made with stamping surface 112 leaves a message. Stamping surface 112 may be substantially parallel to the extension axis 196 of the tape of the tape measure 190, and substantially perpendicular to the concave axis 198 of the tape of the tape measure 190. In some embodiments, stamping surface 112 is not parallel, but angled relative to the extension axis 196 of the tape, such as at a 5°, 10°, 15°, 20°, 25°, 30°, 35°, 40°, or 45° angle relative to the extension axis 196, or between any two of these angles. In some embodiments, the stamping surface 112 is perpendicular or orthogonal to a concave axis 198 of the tape measure 190.

Binder 130 is a coupling member or coupling component configured to selectively couple stamping tool 100 to tape measure 190. Binder 130 comprises a body. Binder 130 defines a recess 132 sized and shaped to receive a portion of tape measure 190, such as the metal hook or tongue 192 and/or tape of a tape measure 190.

In some embodiments, applicator 110 comprises a rear edge 118 defining a limit of applicator 110 and/or stamping surface 112. When stamping tool 100 is coupled with tape measure 190, rear edge 118 may substantially align with tape edges 199 and not project farther rearward than tape edges 199 such that the applicator 110 does not substantially overhang tape edges 199.

The innovative design of stamping tool 100 takes advantage of the physical properties of a common concave-convex tape measure and its ubiquity in construction sites to conveniently extend the reach of a worker for stamping elements of construction using tools that contractors, workers, and inspectors have on hand, nearby, or on their person.

When stamping tool 100 is attached to tape measure 190, stamping surface 112 of applicator 110 may be perpendicular to the direction of extension of the tape. The tape can be extended out to position the stamping tool 100 proximate a surface to be marked or stamped, then a stamp or mark can be made on the surface by pressing stamping surface 112 of applicator 110 onto the distant surface. Because stamping surface 112 is perpendicular to extension axis 196, the tape retains rigidity while a worker presses applicator 110 onto the distant surface. The stamping tool 100 produces a stamp mark of the defined size and shape from the stamping surface 112 of applicator 1110. Thus, the worker can produce a clean stamp mark on the faces of construction elements that are largely perpendicular to a line-of-sight from the worker, such as the bottom surface of a ceiling joist.

Figure 2:
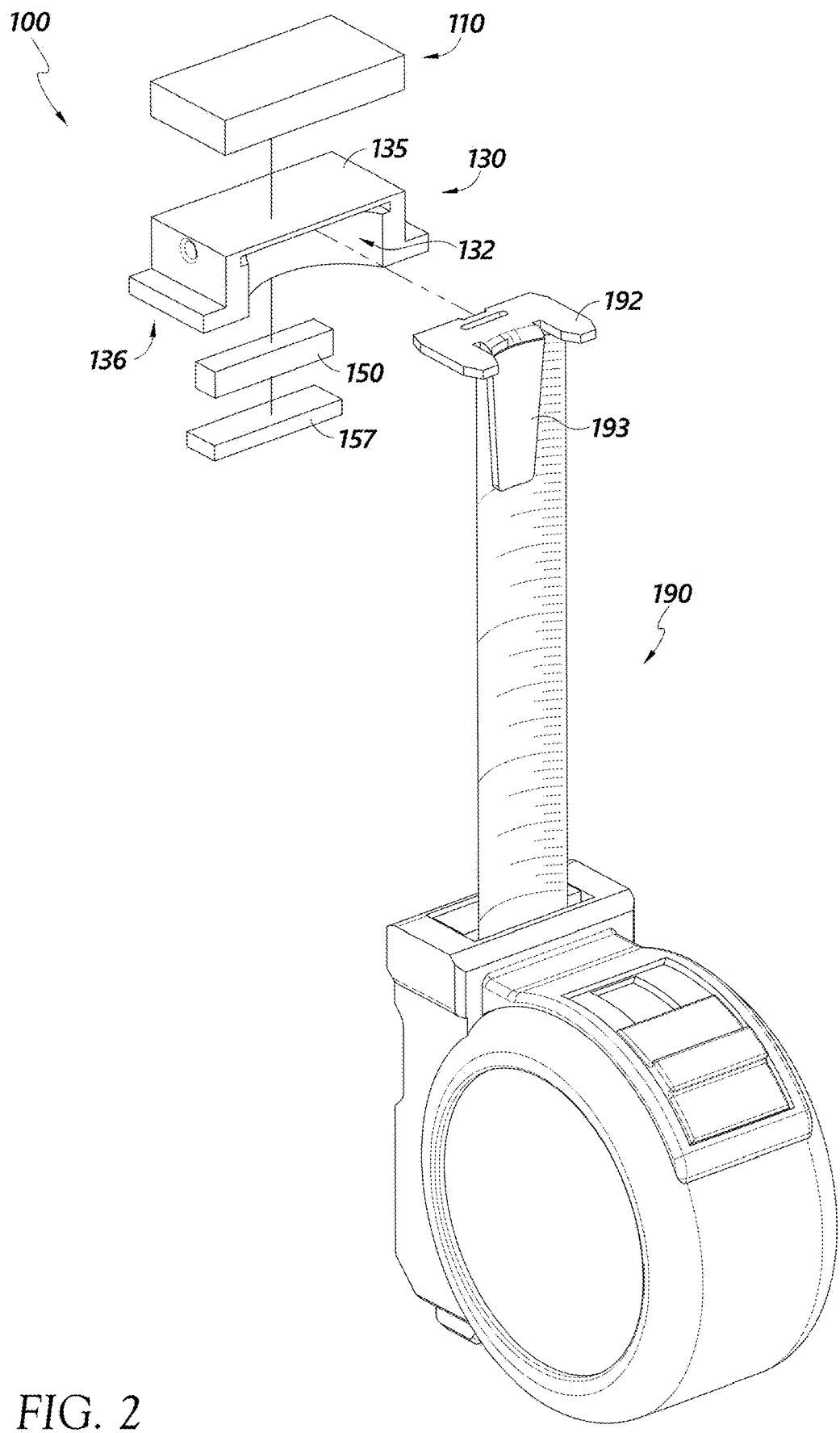
FIG. 2 is an exploded view of the example embodiment of a stamping tool of FIG. 1.

FIG. 2 illustrates an exploded view of the example embodiment of a stamping tool 100 of FIG. 1. As shown in FIG. 2, applicator 110 is attached to a top surface 135 of binder 130. A magnet cavity (not visible in FIG. 2) is disposed within binder 130, sized and shaped to receive magnet 150. The magnet cavity opens on the bottom surface 136 of binder 130. Magnet cover 157 is sized and shaped to substantially cover the opening of the magnet cavity to hold the magnet 150 within binder 130. The magnet 150 and the magnet cavity are positioned in the binder 130 such that the magnetic field of the magnet 150 can interact with the hook 192 of the tape measure when the hook 192 is inserted into the recess 132. The magnet 150 attracts the hook 192, which is generally formed of a ferromagnetic material, and the interaction between the magnet 150 and the hook 192 removably secures the stamping tool 100 to the tape measure 190. The strength of magnet 150 is high enough to secure the stamping tool 100 to the hook 192 such that the stamping tool 100 does not separate from or fall off the tape measure 190 during a stamping or marking operation, but low enough that the stamping tool 100 can be removed from the hook 192 by a user or operator without difficulty.

In some embodiments, magnet 150 is disposed on an exterior surface of stamping tool 100, and stamping tool 100 does not comprise the magnet cavity or magnet cover 157. In some embodiments, magnet 150 is formed within binder 130, and stamping tool 100 does not comprise magnet cover 157.

Some tape measures 190 may comprise metal tang 193 aligned with the tape and near the hook 192. Metal tang 193 may comprise a magnetic material or may be a magnet. In some embodiments, the orientation and placement of magnet 150 in binder 130 is configured to allow a magnetic field of magnet 150 to interact with a magnetic field of the metal tang 193. This may help attract and/or couple stamping tool 100 with tape measure 190.

FIGS. 3A-3D illustrate perspective views of the stamping tool 100 of FIGS. 1-2. As shown, recess 132 is disposed on the rear surface 138 of binder 130. Recess 132 comprises a hook recess 133 configured to receive the metal hook 192 of a tape measure 190. Hook recess 133 may be in the shape of a slot. Recess 132 also comprises tape recess 134 configured to receive a portion of the tape of a tape measure 190 near the metal hook 192. Tape recess 134 may have the concave shape of a tape measure tape and include an opening on the bottom surface 136 of the binder 130 for the tape measure tape. Magnet cover 157 is shown in place over the magnet cavity, holding the magnet in place.

Binder 130 comprises engagement feature 139 configured to couple to a corresponding engagement feature on a stamp cover. Engagement feature 139 is a hole or indent recessed into binder 130. Engagement feature 139 receives a knuckle on a stamp cover (not shown) to maintain the position of the stamp cover over at least a portion of stamping tool 100. In some embodiments, engagement feature 139 comprises a lip, a helical thread, or a recess. In some embodiments, engagement feature 139 comprises two or more engagement features, such as two holes recessed into binder 130. In some embodiments, engagement feature 139 is disposed on stamping tool 100 on a feature separate from binder 130.

Figure 3A:
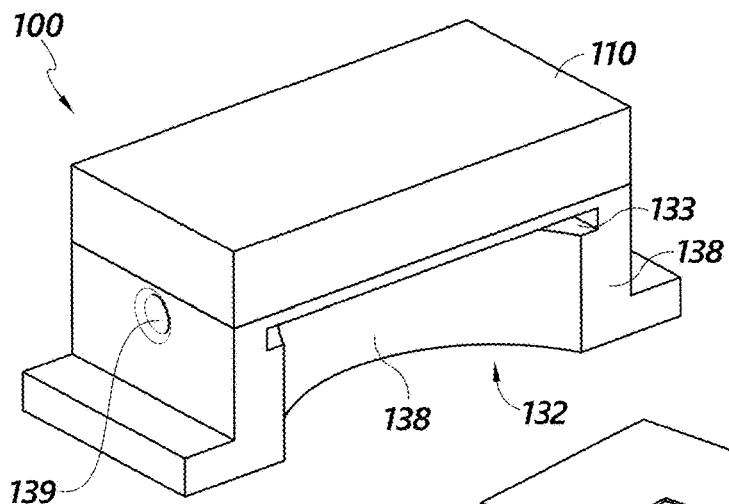
FIG. 3A is a top and rear perspective of the example embodiment of a stamping tool of FIGS. 1-2.
Figure 3B:
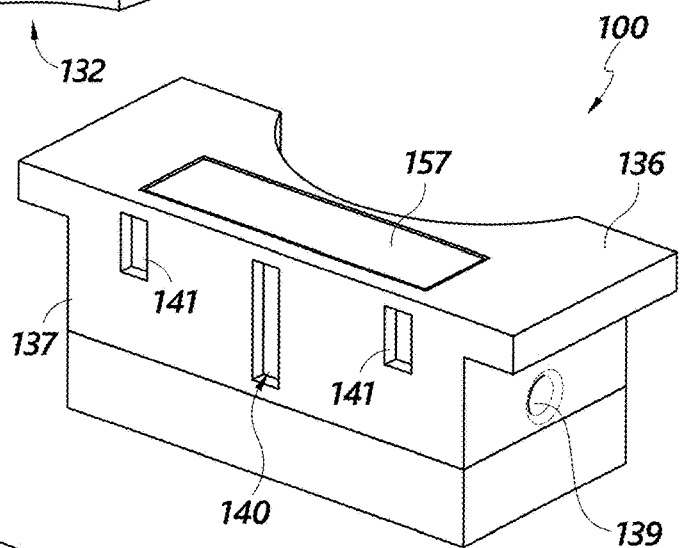
FIG. 3B is a bottom and front perspective of the example embodiment of a stamping tool of FIGS. 1-2.
Figure 3C:
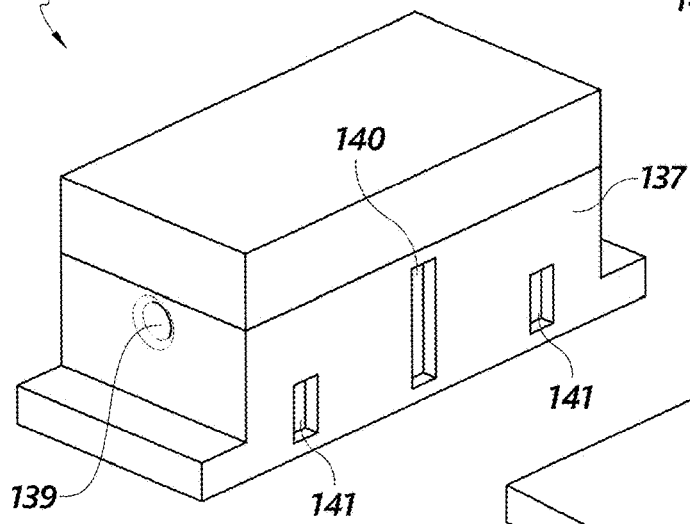
FIG. 3C is a top and front perspective of the example embodiment of a stamping tool of FIGS. 1-2.
Figure 3D:
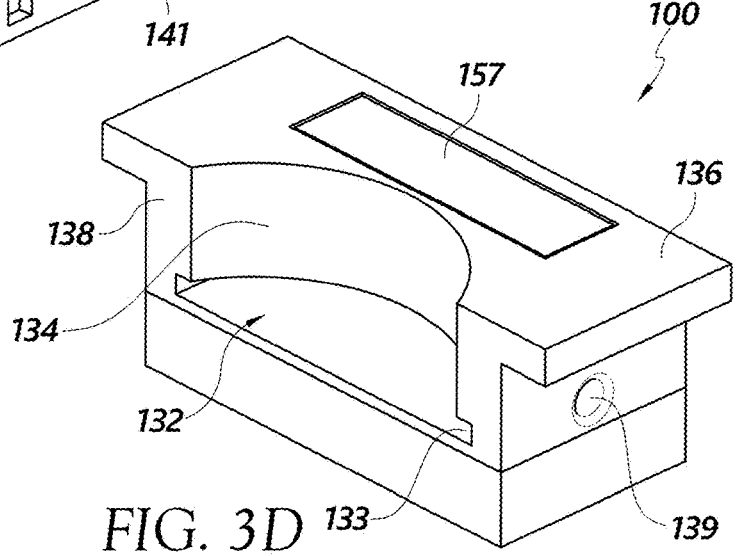
FIG. 3D is a bottom and rear perspective of the example embodiment of a stamping tool of FIGS. 1-2.

Stamping tool 100 includes features to assist the user to precisely place a stamp at a distant location. As shown in FIGS. 3B-3C, binder 130 comprises a center mark 140 placed at or near a center plane of stamping tool 100. Center mark 140 may assist in precisely placing a stamp mark at an indicated location by lining up center mark 140 with that location. Because the stamping may occur at a distance, and the stamping surface 112 is not visible to the user during a stamping operation, the center mark 140 can be seen by the user to align the stamping tool in the desired location. Binder 130 further comprises offset marks 141 placed a known offset from a center plane of stamping tool 100. Offset marks 141 may assist in precisely placing a stamp mark at the center of surface by lining up the offset marks 141 with the edges of a surface, such as the edges of a joist. In some embodiments, the offset marks are offset ⅛", ¼", or ½", or any other desired distance, from the center mark 140. Center mark 140 and offset marks 141 are defined by the front surface 137 of binder 130. In some embodiments, the center mark 140 and the offset marks 141 are recessed or indented into the front surface 137. In some embodiments, the center mark 140 and the offset marks 141 extend or protrude from the front surface 137. In some embodiments, center mark 140 and offset marks 141 are not defined by the front surface 137, but are indicated by a different feature such as color. In some embodiments, center mark 140 and offset marks 141 are defined or placed on the rear surface 138 of binder 130. In some embodiments, center mark 140 and offset marks 141 are defined or placed on the bottom surface 136 or a side surface of binder 130.

Figure 4:
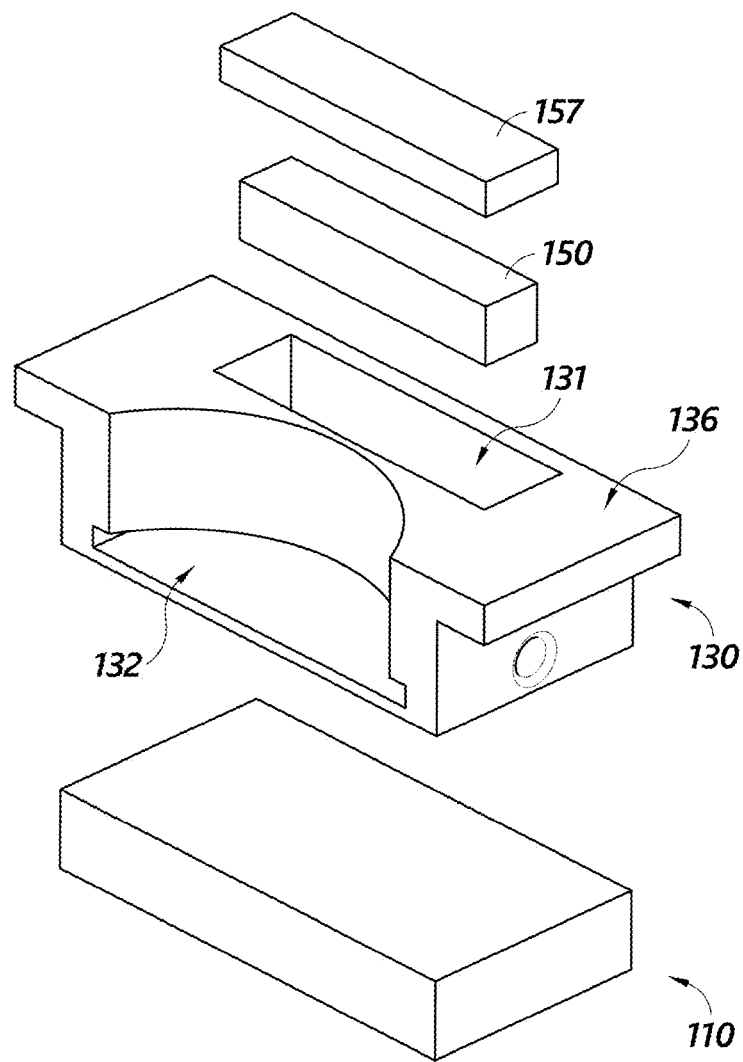
FIG. 4 is an exploded view of the example embodiment of a stamping tool of FIGS. 1-3D.

FIG. 4 illustrates an exploded view of the example embodiment of stamping tool 100 of FIGS. 1-3D. As shown, stamping tool 100 comprises applicator 110, binder 130, and magnet 150. Bottom surface 136 of binder 130 defines magnet cavity 131, which sized and shaped to receive magnet 150. Magnet cavity 131 is disposed near recess 132 to interact with the metal hook of a tape measure when recess 132 receives a portion of a tape measure. Magnet cover 157 is sized and shape to substantially cover the hole formed in bottom surface 136 by magnet cavity 131 and hold magnet 150 in place.

Figure 5A:
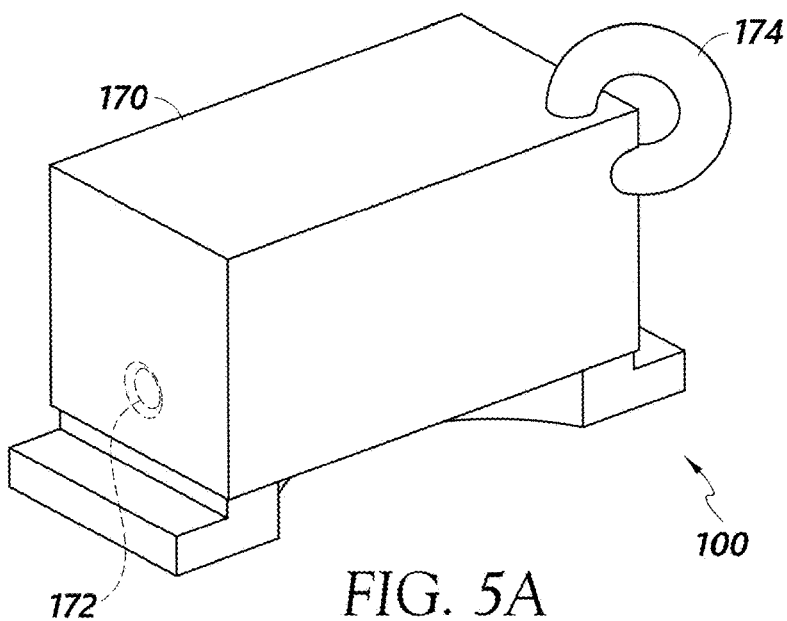
FIG. 5A is a perspective view of an example embodiment of a stamp cover on a stamping tool.
Figure 5B:
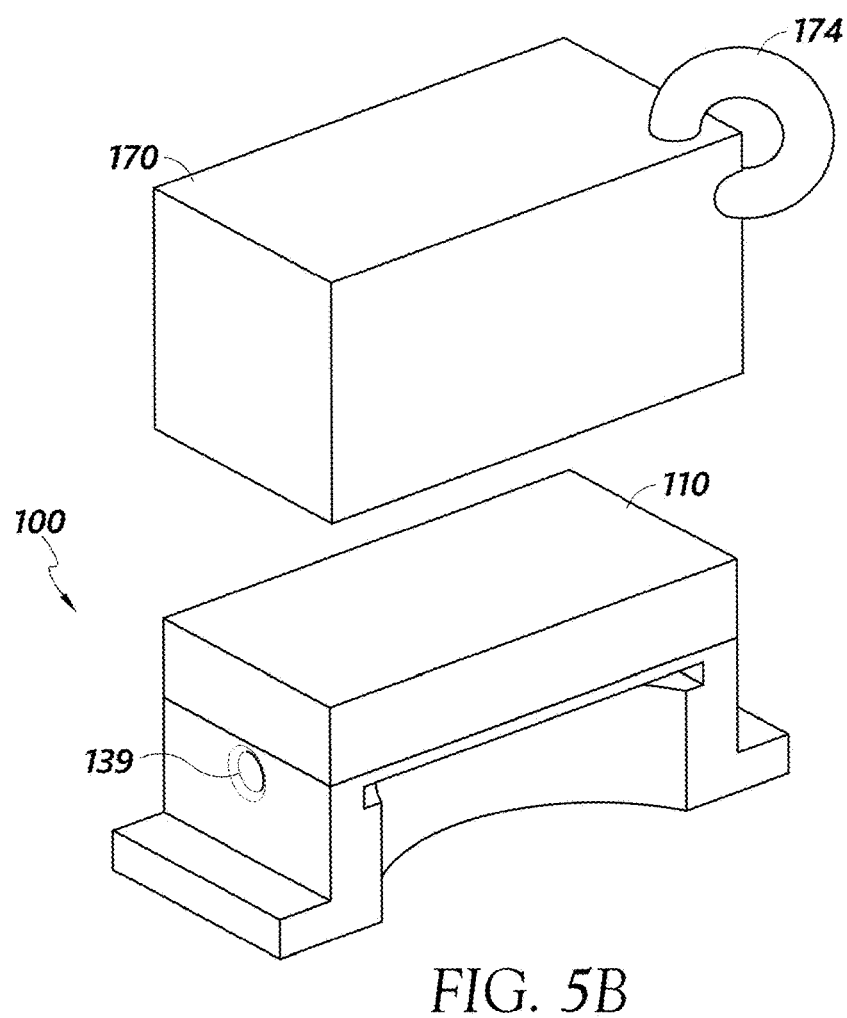
FIG. 5B is a perspective view of an example embodiment of a stamp cover separated from the stamping tool.

FIGS. 5A-5B illustrate the example embodiment of stamping tool 100 of FIGS. 1-4 with a stamp cover 170. FIG. 5A illustrates stamp cover 170 in place covering at least a portion of stamping tool 100. As shown, stamp cover 170 is configured to shield at least applicator 110 from exposure to air, sunlight, and dust, so to slow or prevent the colorant of applicator 110 from drying out or collecting debris when the stamping tool 100 is not in active use. Stamp cover 170 may also prevent inadvertent marks, such as on the clothing or tools of the user when stamping tool 100 is not in use. Stamp cover 170 may comprise an interior cavity for receiving at least a portion of stamping tool 100.

Stamp cover 170 also comprises corresponding engagement feature 172 configured to couple to engagement feature 139 of stamping tool 100. Corresponding engagement feature 172 and engagement feature 139 can maintain stamp cover 170 in place over stamping tool 100 until the user is ready to place a stamp. Corresponding engagement feature 172 comprises a knuckle on a surface of stamp cover 170, sized and shaped to fit into the hole of engagement feature 139. The surface may face the interior cavity of stamp cover 170. Corresponding engagement feature 172 holds stamp cover 170 in place over stamping tool 100 by friction or by the elasticity of the material of the stamping tool 100 or stamp cover 170. In some embodiments, corresponding engagement feature 172 comprises a clip, a lip, a recess, or a helical thread configured to engage engagement feature 139. In some embodiments, stamp cover 170 comprises multiple corresponding engagement features.

Stamp cover 170 comprises attachment point 174. Attachment point 174 is disposed on an outside surface of stamp cover 170, and allows the user to attach or tether stamp cover 170 to another object besides stamping tool 100. Attachment point 174 is a ring configured to attach to a key ring, belt loop, a carabiner, a hook, or the like. In some embodiments, attachment point 174 may comprise a clip for attaching stamp cover 170 to a belt or work belt.

FIG. 5B illustrates stamp cover 170 over stamping tool 100. As shown, stamp cover 170 is sized and shaped to cover and/or receive at least a portion of stamping tool 100 and protect applicator 110 from exposure to air and dust.

Figure 6:
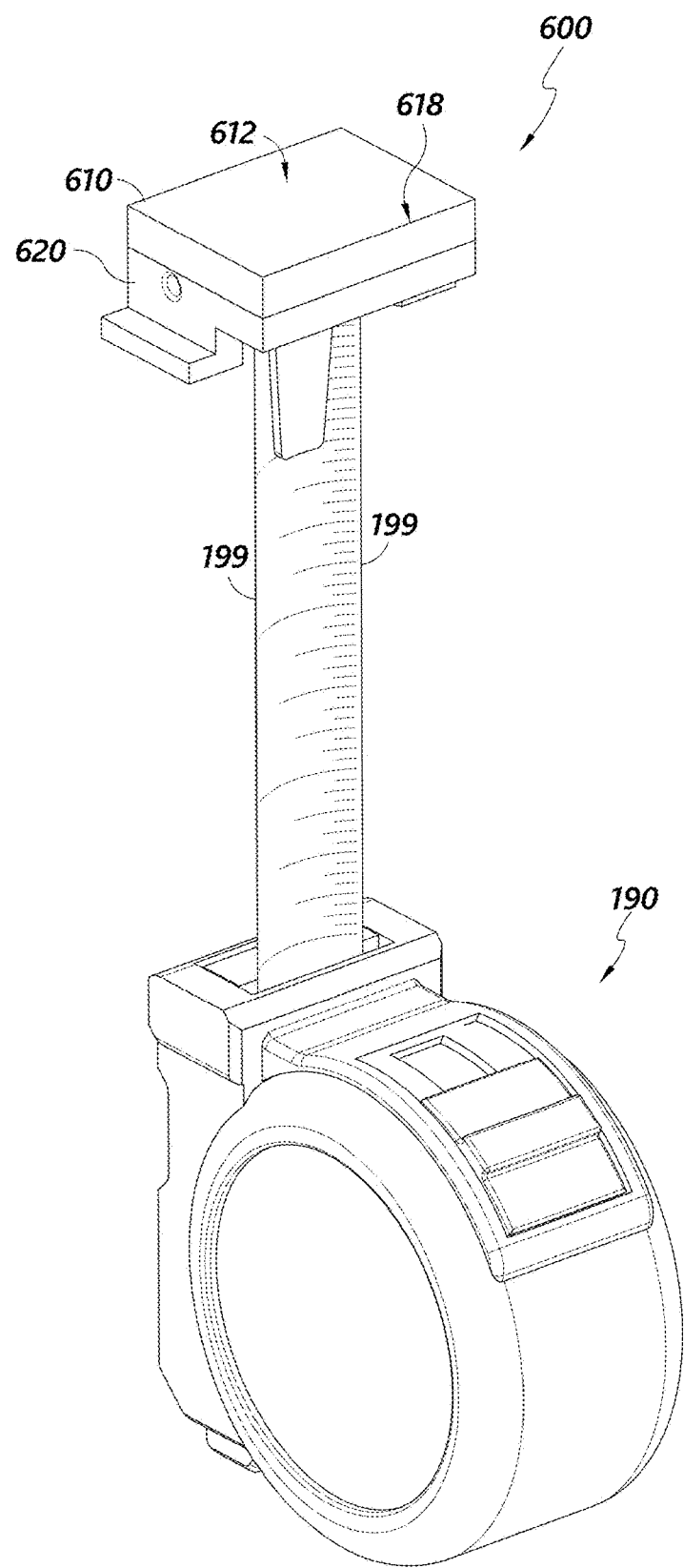
FIG. 6 is a perspective view of an example embodiment of a stamping tool attached to a tape measure.
Figure 7:
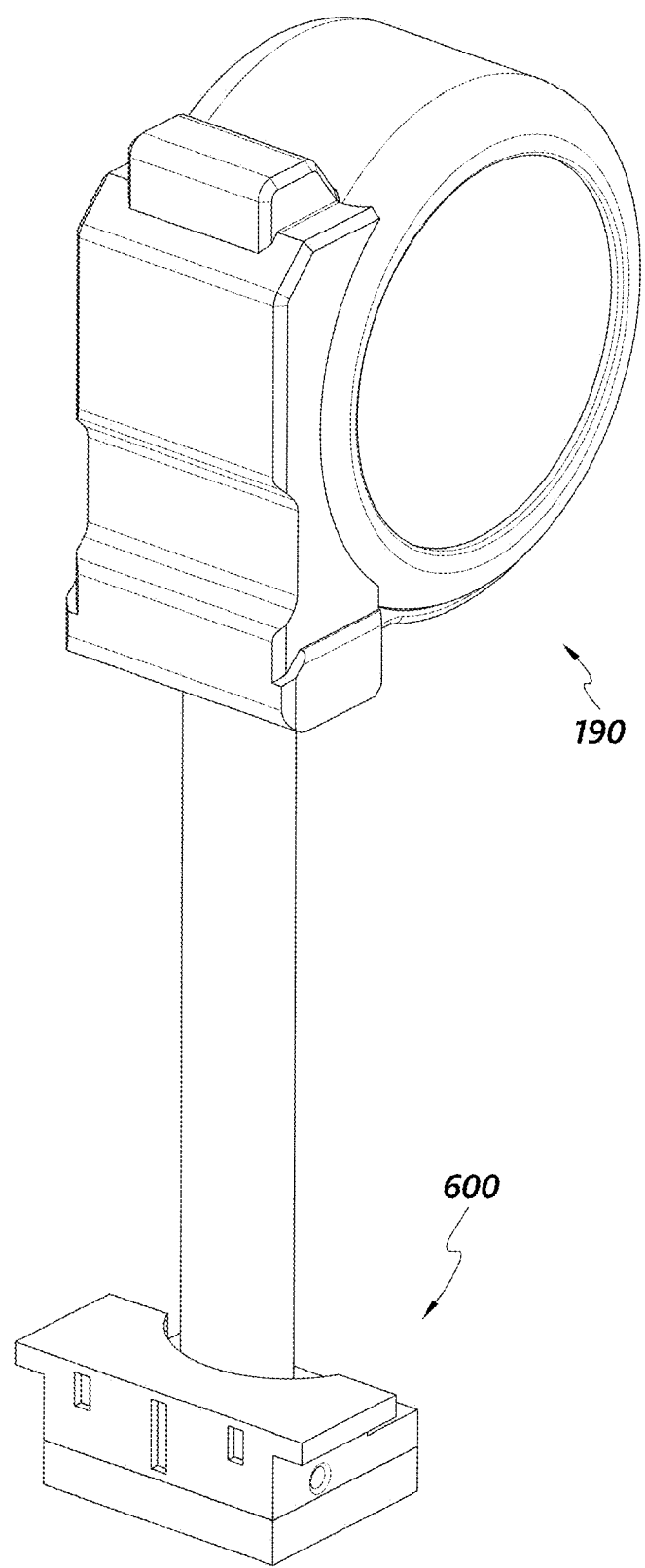
FIG. 7 is a perspective view of an example embodiment of a stamping tool of FIG. 6.

FIGS. 6-7 illustrate perspective views of an example embodiment of a stamping tool 600 wherein the stamping tool is attached to a tape measure 190. The stamping tool comprises applicator 610, binder 620, and a magnet (not shown in FIGS. 6-7). In this example embodiment, rear edge 618 of applicator 610 extends beyond tape edges 199 such that applicator 610 largely overshadows the tape when stamping tool 600 is coupled to tape measure 190. This allows for a large stamping surface 612.

Figure 8:
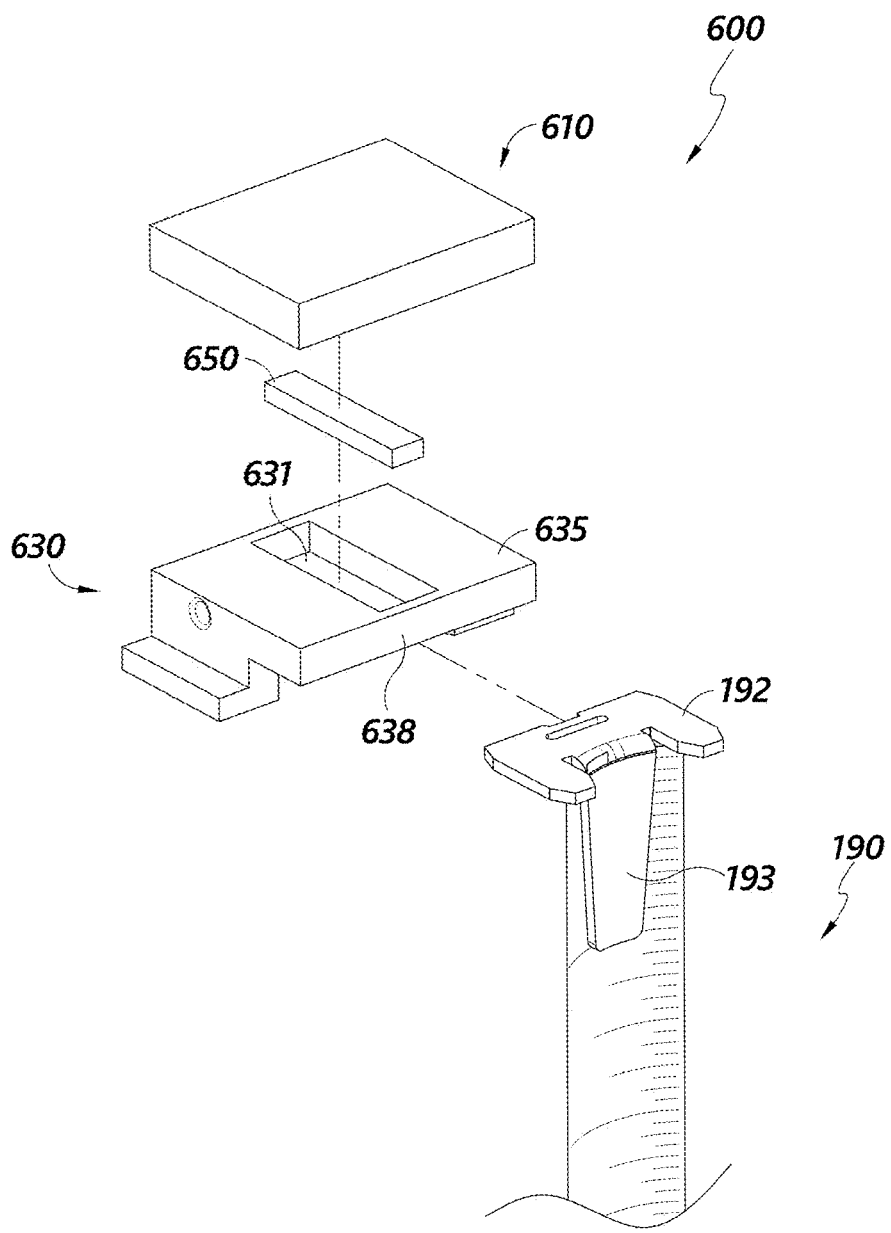
FIG. 8 is an exploded view of the example embodiment of a stamping tool of FIGS. 6-7.

FIG. 8 illustrates an exploded view of the example embodiment of stamping tool 600 of FIGS. 6-7. As shown in FIG. 8, applicator 610 is attached to a top surface 635 of binder 630. A magnet cavity 631 is disposed within binder 630, sized and shaped to receive magnet 150. Magnet cavity 631 opens on the top surface 635 of binder 630, beneath applicator 610.

Some tape measures 190 may comprise metal tang 193 aligned with the tape and near the hook 192. Metal tang 193 may comprise a magnetic material. In some embodiments, the orientation and placement of magnet 650 in binder 630 is configured to allow magnet 650 to interact with metal tang 193 as well as with the hook 192. This may help attract and/or couple the stamping tool 600 with tape measure 190 more securely than if the magnet 650 attracted only the hook 192. Magnet 650 is in an elongated bar shape, and magnet cavity 631 orients magnet 650 such that the elongated direction is perpendicular to the rear surface 638 of binder 630 that defines the recess. In some embodiments, the magnet is a button shape or a square shape.

Figure 9:
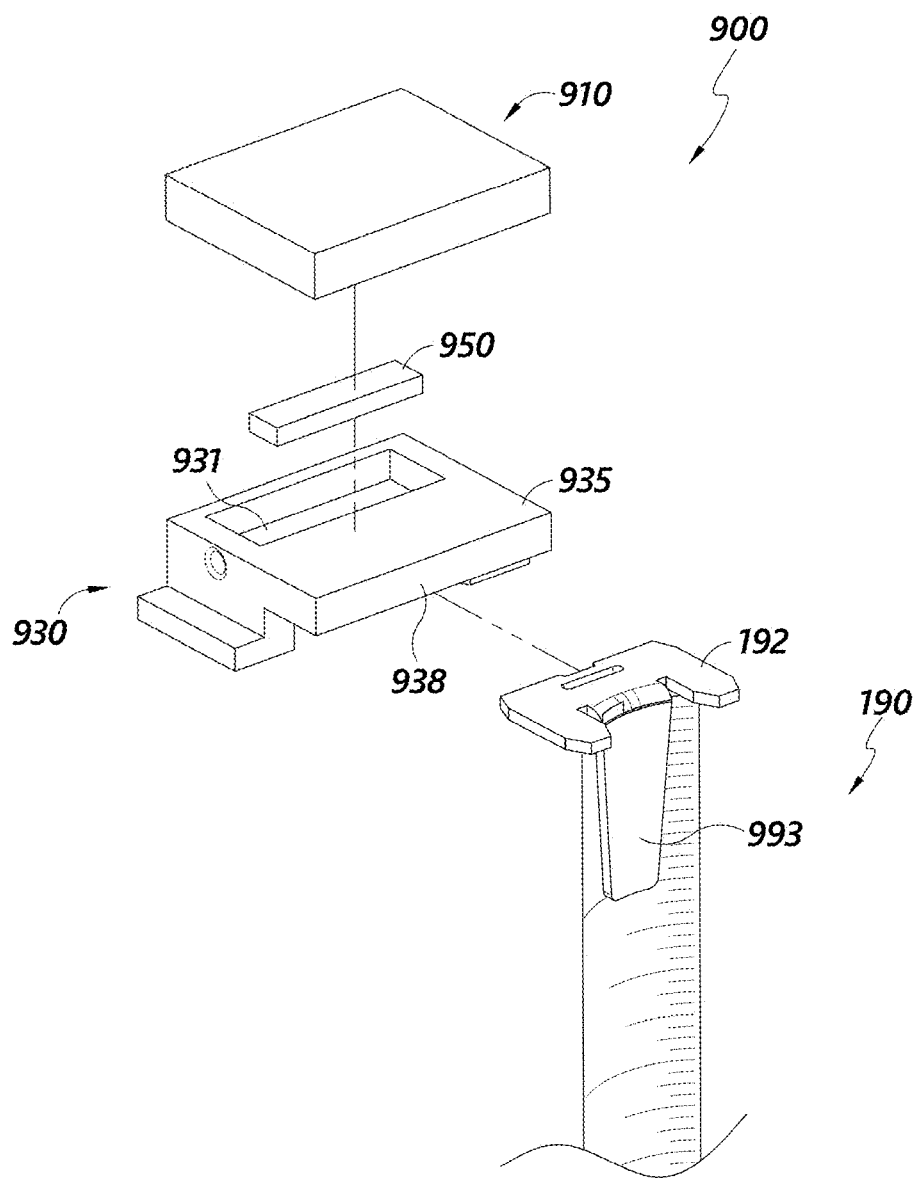
FIG. 9 is an exploded view of an example embodiment of a stamping tool.

FIG. 9 illustrates an exploded view of an example embodiment of a stamping tool 900. Stamping tool 900 comprises applicator 910, binder 930, and magnet 950. As shown, applicator 910 may conjoin a top surface 935 of binder 930. A magnet cavity 931 is disposed within binder 930, sized and shaped to receive magnet 950. Magnet cavity 931 opens on the top surface 935 of binder 930. Magnet 950 is an elongated bar shape, and magnet cavity 931 orients magnet 950 such that the elongated direction is parallel to the rear surface 938 of binder 930 that defines the tape measure recess. The different magnet orientations between FIGS. 8 and 9 may produce a different amount of attraction between the magnet and metal hook 192 of the tape measure and the metal tang 193.

FIGS. 10A-10D illustrate perspective views of the stamping tool 900 of FIG. 9. As the differences between stamping tool 900 of FIG. 9 and stamping tool 600 of FIGS. 6-8 are internal, FIGS. 10A-10D also show the features of stamping tool 600. The features of stamping tool 600 may be similar to those described elsewhere herein. As shown, tape measure recess 932 is disposed on the rear surface 938 of binder 930.

Tape measure recess 932 comprises hook recess 933 configured to receive the metal hook of a tape measure. Hook recess 933 may be in the shape of a slot. Tape measure recess 932 also comprises tape recess 934 configured to receive a portion of the tape of a tape measure near the metal hook. Tape recess 934 may have the concave shape of a tape measure tape and include an opening on the bottom surface 936 of the binder 930 for the tape measure tape. As shown, rear edge 918 of applicator 910 extends farther rearward than where the edges of the tape of a tape measure would sit when a tape measure is received in tape measure recess 932. This allows for a large applicator 910.

Figure 10A:
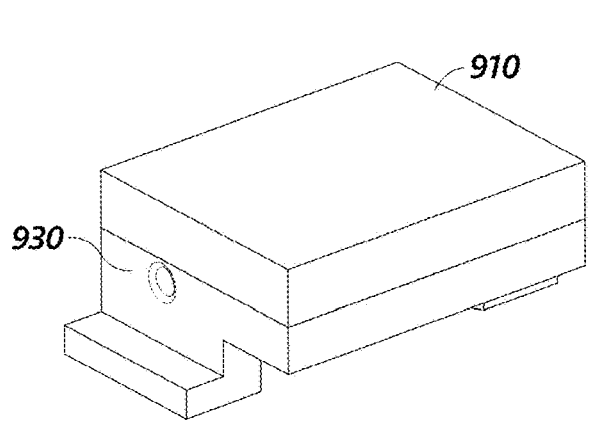
FIG. 10A is a top and rear perspective of the example embodiment of a stamping tool of FIG. 9.
Figure 10B:
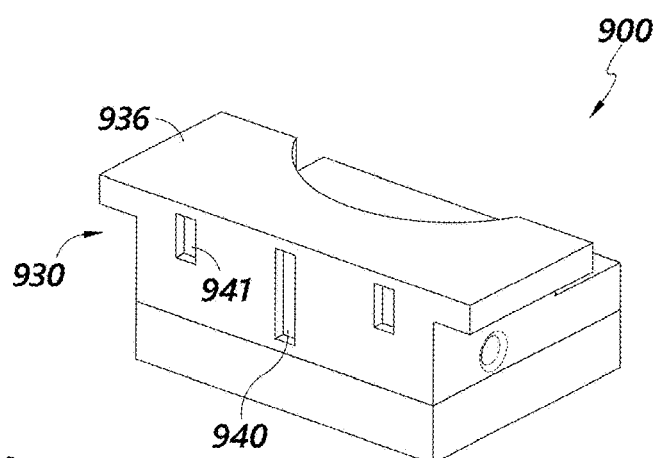
FIG. 10B is a bottom and front perspective of the example embodiment of a stamping tool of FIG. 9.
Figure 10C:
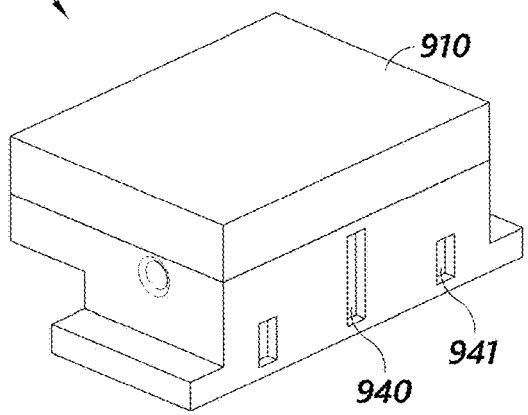
FIG. 10C is a top and front perspective of the example embodiment of a stamping tool of FIG. 9.
Figure 10D:
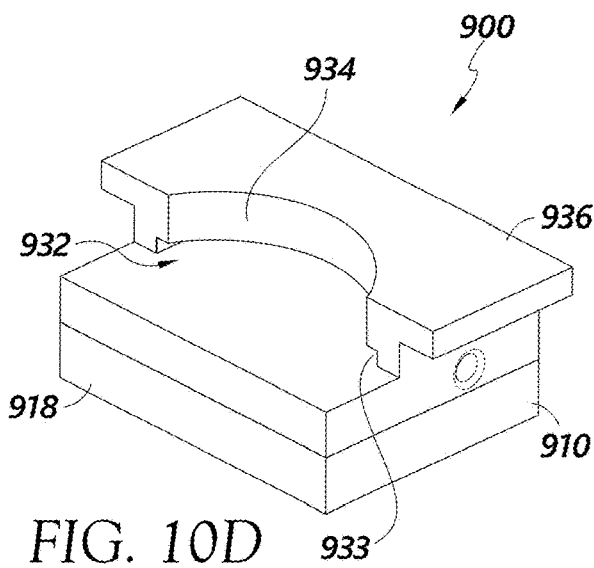
FIG. 10D is a bottom and rear perspective of the example embodiment of a stamping tool of FIG. 9.

Stamping tool 900 may include features to assist the user to precisely place a stamp at a distant location. As shown in FIGS. 10B-10C, binder 930 comprises a center mark 940 placed at or near a center plane of stamping tool 100, and offset marks 941, similar to those described elsewhere herein.

Figure 11:
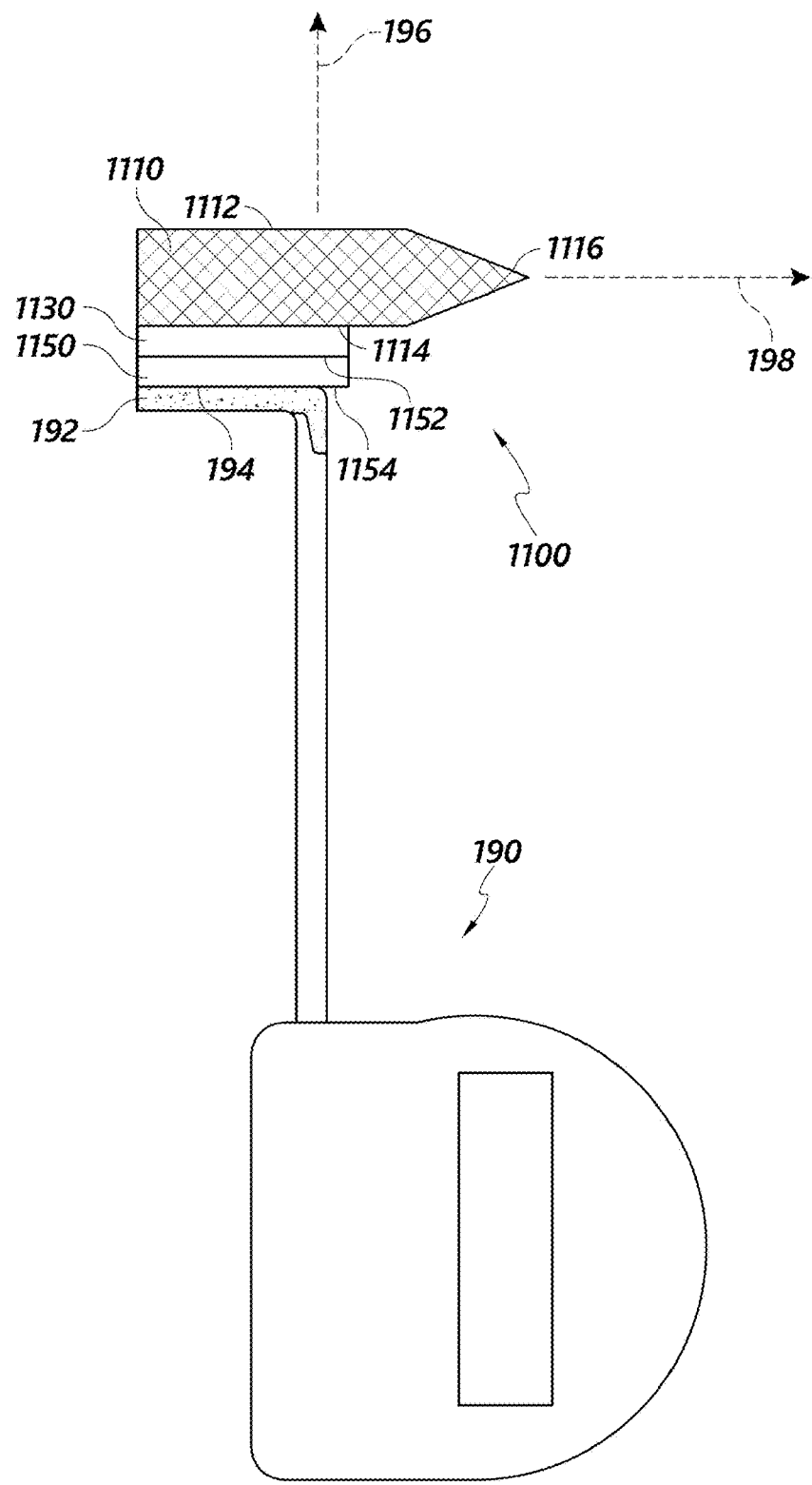
FIG. 11 is a side view of an example embodiment of a stamping tool attached to a tape measure.

FIG. 11 illustrates an example embodiment of a stamping tool 1100 wherein the stamping tool 1100 is attached to a tape measure 190. The stamping tool 1100 comprises applicator 1110, binder 1130, and magnet 1150.

Stamping tool 1100 includes applicator 1110. Applicator 1110 comprises a stamping surface 1112, a backing surface 1114, and a marking surface 1116. Stamping surface 1112 is opposite to backing surface 1114. Applicator 1110 is configured to adsorb or absorb a colorant to which it comes in contact, then carry that colorant until stamping surface 1112 or marking surface 1116 contacts another surface such as a joist, stud, ceiling, etc. Upon contact with another surface, applicator 1110 releases some of the colorant it carried to leave a mark in the form of a stamp. To absorb colorant, applicator 1110 may comprise a rubber, a sponge, or a foam-like material that is soft and porous. These qualities allow applicator 1110 to decrease in volume when squeezed and apply a liquid colorant, and to increase in volume when released to absorb a liquid colorant. In some embodiments, the applicator 1110 can be self-inking or self-marking such that the applicator need not be dipped in or absorb colorant just prior to making a mark.

Stamping surface 1112 is at least partially planar for producing a stamp mark of defined size and shape when stamping surface 1112 contacts another surface and applicator 1110 is squeezed and deformed. For example, stamping surface 1112 may form a letter, word, or symbol, or comprise raised or sunken portions such that a stamp mark made with stamping surface 1112 leaves a message. Marking surface 1116 is depicted as pointed (i.e., a chisel tip) for producing a stamp mark of variable size and shape depending on the force between marking surface 1116 and another surface which it contacts. In some embodiments, the marking surface 1116 need not be pointed, or the applicator need not have a chisel tip. In some embodiments, the marking surface 1116 is disposed on a different side of applicator 1110 as herein depicted, i.e., marking surface 1116 points away from concave axis 198. In some embodiments, the applicator 1110 can have a chisel tip extending along extension axis 196 such that lines or other thinner types of marks, as compared to stamps, can be made on the desired location.

Stamping tool 1100 includes binder 1130. Binder 1130 is disposed on backing surface 1114 of applicator 1110, and secures applicator 1110 to magnet 1150. Binder 1130 may comprise an adhesive fixing the backing surface 1114 of applicator 1110. Binder 1130 may comprise an adhesive fixing a top surface 1152 of magnet 1150. Binder 1130 may comprise a binder spine disposed between backing surface 1114 of applicator 1110 and top surface 1152 of magnet 1150. In some embodiments, the binder 1130 is a rigid or semi-rigid material which gives stability or support to the applicator 1110, which may be a flexible surface such as a foam, which does not maintain its rigidity when manipulated.

Stamping tool 1100 includes magnet 1150. Magnet 1150 comprises a top surface 1152 and bottom surface 1154. Magnet 1150 is secured to applicator 1110 by means of binder 1130, which is disposed above top surface 1152. Bottom surface 1154 is configured to adjoin the outer face 194 of a metal hook 192 of a tape measure. In some embodiments, wherein the magnet 1150 comprises a magnetized material, stamping tool 1100 will removably affix to the metal hook 192 of a tape measure 190 when bottom surface 1154 of magnet 1150 is placed in contact with the outer face 194 of the metal hook 192. In some embodiments, the magnet 1150 comprises a ferro-magnetic material which can be attracted to and attached to a magnetized metal hook 192 of the tape measure 190.

The concave-convex tape measure 190 has tape that can be fed out from or retracted into the tape measure case. Tape, once fed out, forms an elongated surface that is mostly straight in the extension axis 196 toward the metal hook 192 at the far end of the tape, but forms a concave gutter-like shape in the perpendicular, concave axis 198. This concave shape affords the extended tape some rigidity. The tape rigidity is especially resistant to deformation when placed in compression, i.e., when metal hook 192 is pressed along extension axis 196 toward the tape measure case. The tape is moderately resistant to deformation when subjected to shear force in the direction of convexity, i.e., when the hook of the tape is pressed toward the convex side of the tape opposite concave axis 198. The tape is least resistant to deformation and collapses easily when subjected to shear force in the direction of concavity, i.e., when the hook of the tape is pressed toward the concave side of the tape in the direction of concave axis 198.

When stamping tool 1100 is attached to tape measure 190, marking surface 1116 of applicator 1110 faces concave axis 198 of the tape. Because the tape of tape measure 190 has only moderate rigidity when pressed in this direction, marking surface 1116 is pointed/beveled such that only slight pressure is required to press the tip of marking surface 1116 into a construction element and leave a mark. This design allows a worker to leave a mark on the faces of construction elements that are largely parallel to a line-of-sight from the worker, such as a high point on a wall the worker stands beneath.

In some embodiments, stamping surface 1112, backing surface 1114, top surface 1152 of magnet 1150, and bottom surface 1154 of magnet 1150 are all parallel surfaces. In some embodiments, stamping surface 1112, backing surface 1114, top surface 1152 of magnet 1150, and bottom surface 1154 of magnet 1150 all face along extension axis 196. In some embodiments, marking surface 1116 can extend in the opposite direction of that indicated by arrow 1198.

Figure 12:
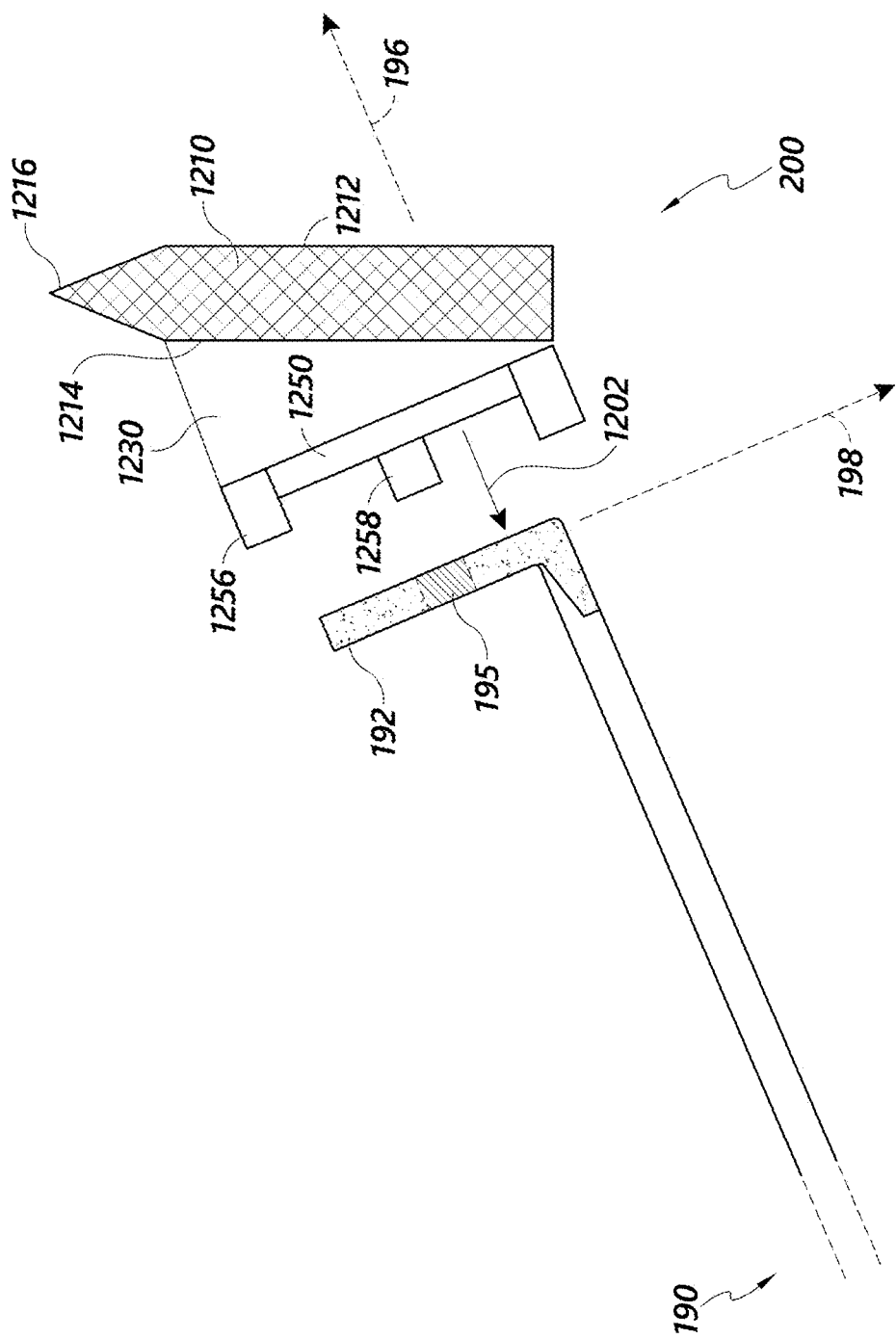
FIG. 12 is a side view of an example embodiment of an angled stamping tool, illustrating its attachment to a tape measure.

FIG. 12 illustrates an angled example embodiment of a stamping tool 1200 wherein the stamping tool 1200 is in close proximity to a tape measure 190. The stamping tool 1200 comprises applicator 1210, binder 1230, and magnet 1250.

Applicator 1210 comprises stamping surface 1212, backing surface 1214, and marking surface 1216. Stamping surface 1212 is opposite to backing surface 1214.

Stamping tool 1200 includes binder 1230. Binder 1230 is disposed on backing surface 1214 of applicator 1210, and secures applicator 1110 to top surface 1252 of magnet 1150.

Binder 1230 is shaped to have an angle such that backing surface 1214 and stamping surface 1212 of applicator 1210 are not parallel to bottom surface 1254 of magnet 1250. With bottom surface 1254 of magnet 1250 placed and secured to metal hook 192 of a tape measure 190 as suggested by arrow 1202, stamping surface 1212 is angled at least somewhat away from extension axis 196 of the tape measure and at least somewhat toward concave axis 198.

Stamping tool 1200 includes magnet 1250. Magnet 1250 comprises a magnetized material, and has a top surface 1252, a bottom surface 1254, fin 1256, and tab 1258. When bottom surface 1254 is placed in contact with metal hook 192 of tape measure 190, stamping tool 1200 is removably secured to metal hook 192 by both the magnetic attraction between magnet 1250 and metal hook 192, as well as fin 1256. Fin 1256 wraps around one or more edges of metal hook 192 to hinder sliding motion of bottom surface 1254 of magnet 1250 relative to metal hook 192. Tab 1258 projects from bottom surface 1254 of magnet 1250, and is sized and shaped to be received by a hook slot 1195 commonly found in the metal hook 192 of tape measure 190.

In some embodiments, fin 1256 wraps around the edge of metal hook 192 closest to the tape (toward concave axis 198). In some embodiments, fin 1256 wraps around the edge of metal hook 192 closest to the hook tip (away from concave axis 198). In some embodiments, fin 1256 wraps around at least one of the side edges of metal hook 192. In some embodiments, fin 1256 wraps around multiple edges of metal hook 192. In some embodiments, stamping tool 1200 does not comprise fin 1256. In some embodiments, stamping tool 1200 does not comprise tab 1258.

In some embodiments, applicator 1210 is angled such that stamping surface 1212 is angled toward concave axis 198 relative to backing surface 1214. In some embodiments, top surface 1252 of magnet 1250 is angled toward concave axis 198 relative to bottom surface 1254 of magnet 1250.

Stamping tool 1200 carries several advantages. Because stamping surface 1212 is angled relative to extension axis 196 of tape measure 190, stamping tool 1200 allows a worker to place a clean stamp on an out-of-reach surface that is neither parallel nor perpendicular to the worker according to the worker's line of sight. For example, a worker could attach stamping tool 1200 to tape measure 190, apply colorant to applicator 1210 if needed, then extend the tape to stamp a location on a vertical wall that is displaced a few feet lateral and a few feet away from the worker's reach. As another example, a worker could use stamping tool 1200 together with tape measure 190 to stamp a side surface of a joist above the worker's head. The angled shape of stamping tool 1200 allows the worker to employ the rigidity of the tape in compression and the rigidity of the tape toward the concave axis 198 to efficiently place stamp marks in location out of reach. The angled shape of stamping tool 1200 also allows the worker to maintain sight while stamping vertical surfaces that are otherwise out of reach. Where the stamp comprises letters, a message, a symbol, or other identifier, the angle of the applicator 1210 allows for the stamp placed on a high surface to make better or more flush contact with the surface, allowing for greater readability of the letters, message, symbol, or other identifier.

Figure 13:
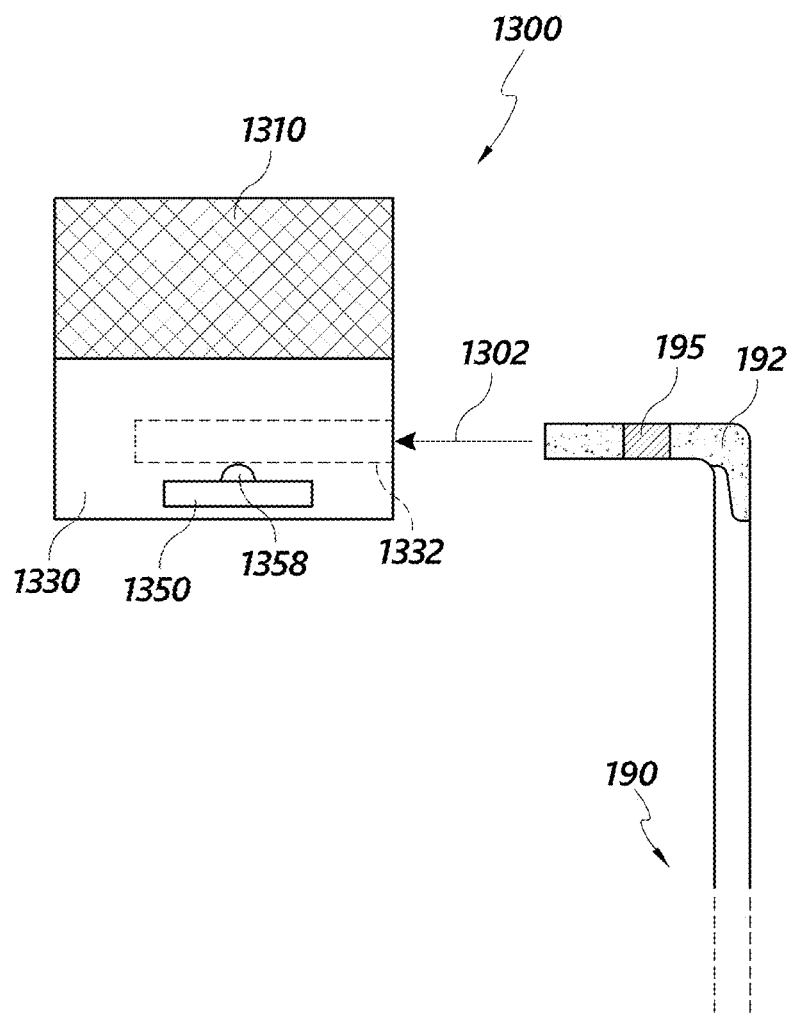
FIG. 13 is a side view of an example embodiment of a stamping tool, illustrating its attachment to a tape measure.

FIG. 13 illustrates an example embodiment of a stamping tool 1300. Stamping tool 1300 comprises applicator 1310, binder 1330, and magnet 1350. Binder 1330 comprises a recess 1332 sized and shaped to receive the metal hook 192 of a tape measure 190. Magnet 1350 is disposed adjacent to or within recess 1332. Magnet 1350 comprises a magnetized material and a tab 1358 that projects toward recess 1332. Tab 1358 is sized and shaped to be received by the hook slot 1195 in the metal hook 192 of a tape measure 190.

Metal hook 192 can be inserted into recess 1332 as indicated by arrow 1302. When metal hook 192 is received in recess 1332, magnet 1350 is attracted to metal hook 192 and is moved toward recess 1332 and toward metal hook 192. Tab 1358, disposed on magnet 1350 is thereby inserted into hook slot 1195 and hinders metal hook 192 from being accidentally removed from binder 1330.

In some embodiments, tab 1358 is rounded such that metal hook 192 can be removed from recess 1332 by pulling it out the way it was received, opposite to arrow 1302. In some embodiments, magnet 1350 comprises a grip such as a hook or tab that can be pulled to remove tab 1358 from hook slot 1195 so that stamping tool 1300 can be removed from the tape measure. In some embodiments, tab 1358 is configured to contact a surface of metal hook 192, instead of hook slot 1195, and secure metal hook 192 in place by friction. In some embodiments, magnet 1350 does not comprise tab 1358. Instead, magnet 1350 is configured to contact a surface of metal hook 192 and secure metal hook 192 in place by friction. In some embodiments, metal hook 192 comprises a magnetized material that will attract magnet 1350 when metal hook 192 is received in recess 1332.

FIG. 14A illustrates an example embodiment of a stamping tool 1400. Stamping tool 1400 is configured to removably attach to the metal hook 192 of a tape measure 190. Stamping tool 1400 comprises raised lettering 1420. This raised lettering 1420 projects outward from stamping tool 1400 such that a stamp left with stamping tool 1400 leaves a positive stamp of the symbols positioned on raised lettering 1420. The raised lettering 1212 allows a worker using stamping tool 1400 to leave a sharp, defined impression on the surface stamped. A crisp impression may be important when the message carried by symbols in the stamp is especially important-such as marking corrections needed in a building inspection.

FIG. 14B illustrates two example embodiments of stamping tools, 400A and 400B, comprising raised lettering 1420. Stamping tool 1400A comprises raised lettering 1420A, spelling out "QA" for "Quality Assurance." Stamping tool 1400A could be used by a building inspector or construction supervisor scrutinizing the results of construction work. For example, if a problem previously noted by a building inspector were correctly remedied by the construction workers, the building inspector upon return to the site could use stamping tool 1400A to mark "QA" at the sites of correction. This communicates the inspector's satisfaction with the corrections. Because stamping tool 1400A is configured for attachment to metal hook 192 of tape measure 190, the inspector could quickly mark sites of correction that are just out of reach.

Stamping tool 1400B comprises raised lettering 1420B, spelling out "SPR" for "Sprinkler." Stamping tool 1400B could be used by a construction manager to indicate locations where construction workers should install fire suppression sprinkler nozzles consistent with the building plan. Because fire suppression sprinklers are installed high overhead, stamping tool 1400B attached to tape measure 190 could be very useful in allowing the construction manager to extend their reach to ceilings and high walls.

Though stamping tool 1400A and stamping tool 1400B include lettering marking "QA" and "SPR," respectively, it should be understood that these are only illustrative examples of the many symbols and letterings that could be incorporated into a stamping tool, without departing from the scope of this disclosure.

In some embodiments, the raised lettering can be the initials of an inspector or a supervisor, can be a serial number associated with an inspector, job, etc., or can otherwise uniquely identify the user marking or stamping the location. In some embodiments, the stamping tool 1400A could be a symbol unique to a particular contractor, inspector, or individual. The stamping tool 1400A can be a serial number for an inspector. In some embodiments, the stamping tool 1400A can be unique to a particular contractor, such as a name, symbol, color or the like. In some embodiments, the stamping tool 1400A can be part of a kit which includes a variety of stamps, each of which indicates a different instruction, such as box, light, speaker, plate, switch, pipe, wire, etc., which are interchangeable on the tape measure. By uniquely identifying the user, ownership, responsibility, and/or accountability can be ensured in the construction process.

FIG. 15A illustrates an example embodiment of a stamping tool 1500. Stamping tool 1500 is configured to removably attach to the metal hook 192 of a tape measure 190. Stamping tool 1500 comprises applicator 1510 which is configured to receive and place colorant. Applicator 1510 comprises stamping surface 1512 and sunken lettering 1522. Sunken lettering 1522 is recessed inward from stamping surface 1512 such that a stamp left with stamping tool 1500 leaves a negative stamp of the symbols positioned in sunken lettering 1522. The sunken lettering 1522 allows a worker using stamping tool 1500 to leave a stamp mark on uneven or tilted surfaces because applicator 1510 can compress such that surface 1512 of applicator 1510 adjusts to the surface to be stamped.

FIG. 15B illustrates two example embodiments of stamping tools 1500A and 1500B, comprising sunken lettering 1522. Stamping tool 1500A comprises sunken lettering 1522A, spelling out "FAN" for "fan." Stamping tool 1500A could be used by a construction manager to indicate locations where construction workers should install exhaust or supply fans consistent with the building plan. Because fans are often installed in difficult-to-reach locations, stamping tool 1500B attached to tape measure 190 could be useful in allowing the construction manager to quickly mark fan locations.

Stamping tool 1500B comprises sunken lettering 1522B that symbolizes an electrical outlet. Stamping tool 1500B could be used by a construction manager or building inspector to indicate locations where an electrical box and/or outlet should be installed. Because some building codes require electrical outlets to have a certain spacing in a building, stamping tool 1500B could be useful in quickly marking locations where such outlets are needed. All the stamping tools described herein can be either raised or sunken, as desired.

Though stamping tool 1500A and stamping tool 1500B include lettering marking a fan and electrical outlet, respectively, it should be understood that these are only illustrative examples of the many symbols and letterings that could be incorporated into a stamping tool, as herein disclosed. For example, the stamping tools described herein may be a depiction of or indicate a light switch, a plumbing fixture, an electrical box, a danger or warning sign, a letter, a number, and the like.

Figure 16:
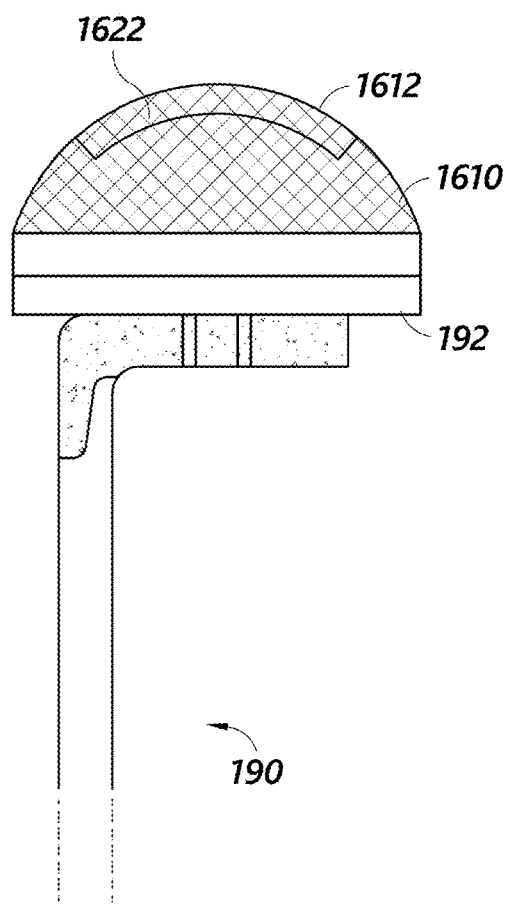
FIG. 16 is a side view of an example embodiment of a stamping tool with a rounded stamping surface.

FIG. 16 illustrates an example embodiment of stamping tool 1600. Stamping tool 1600 is configured to removably attach to the metal hook 192 of a tape measure 190. Stamping tool 1600 comprises applicator 1610 which is configured to receive and place colorant. Applicator 1610 comprises a compressible material, as well as stamping surface 1612 and sunken lettering 1622. Stamping surface 1612 and sunken lettering 1622 are each rounded much like a semicircle when viewed from the side.

Stamping tool 1600 carries several advantages. A worker using stamping tool 1600 with tape measure 190 can employ the rounded surface of stamping surface 1612, the compressible property of a material of applicator 1610, and the sunken lettering 1622 to make a discernable stamp at a distant location from a great variety of angles and distances of the worker relative to the surface of the distant location. For example, a worker standing on an interior balcony may need to mark a chandelier location on a ceiling joist. Though the ceiling joist is several feet above and several feet past the edge of the balcony, the worker could employ stamping tool 1600 with a tape measure to leave a "C" mark at the correct location for the chandelier.

In some embodiments, the stamping tools disclosed are about 0.5" in width, 1.0" in width, 1.5" in width, 2.0" in width, 2.5" in width, or any width therebetween. Because the stamping tools are relatively small and removably attachable to a tape measure, a worker may carry several different stamping tools comprising several different messages and/or several different forms as described in the embodiments above. These different stamping tools allow the worker to use the one most appropriate to the location and purpose of the stamp needed.

Figure 17:
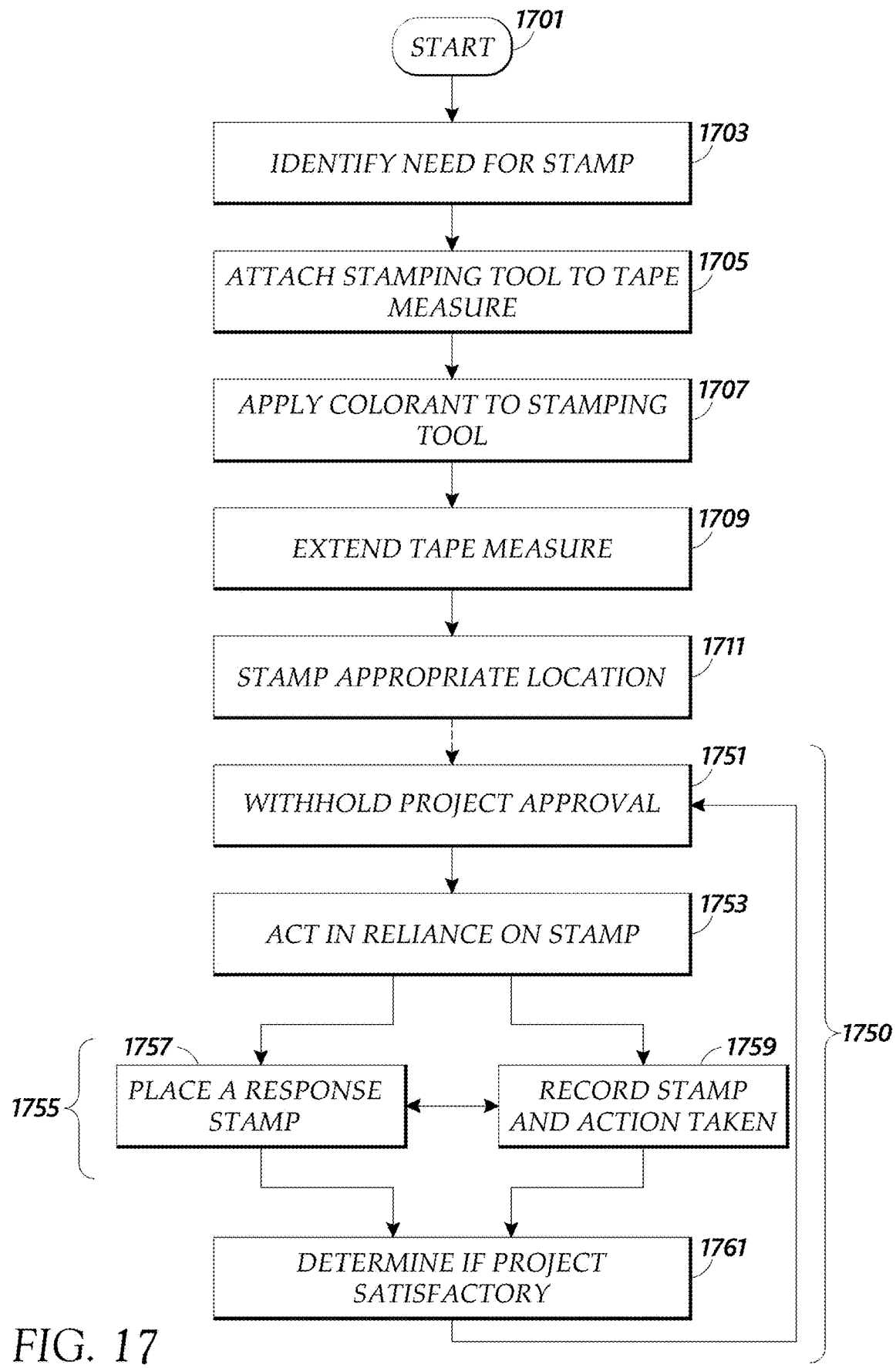
FIG. 17 is a flowchart illustrating an example method of use of a stamping tool.

FIG. 17 is a flowchart illustrating an example method 1700 of using a stamping tool as heretofore described. The method 1700 begins at start block 1701.

The method then moves to block 1703, at which a worker identifies a need to make a stamp on a distant surface. This distant surface may be a surface of a construction element, such as a footing, a frame, a joist, a rafter, a subfloor, or a wall. The worker may be employed on a construction site, such as a construction manager, a supervisor, an electrician, a plumber, or a building inspector. As an example, a building inspector scrutinizing the framing of a new residential construction may discover that the studs far overhead are too distantly spaced to satisfy the building code. The building inspector may wish to leave a stamp for the construction workers, indicating the problem at the location where an additional stud should be installed.

The method then moves to block 1705, at which the worker attaches a stamping tool to a tape measure. At this step, the worker may select a stamping tool comprising the message the worker wishes to convey with the stamp. For example, the worker may select a stamping tool comprising a lightbulb symbol when marking locations for can lights in a ceiling. The worker might select a stamping tool comprising the name or title of the worker, or an indicator unique to a particular worker, supervisor, inspector, etc., such that a stamp made thereby identifies the worker. Then, the worker takes the stamping tool selected and attaches it to the hook of a tape measure. The hook of a common tape measure is usually made of steel. The stamping tool comprises a magnet that will attract the steel of the metal hook of a tape measure. The worker couples the stamping tool to the metal hook of a tape measure by placing them in contact.

The method then moves to block 1707, where the worker applies colorant to the stamping tool. The colorant could be such colorants as a dye, a paint, an ink, or a stain. If the colorant is in liquid form, the worker might apply colorant to the stamping tool by dipping at least a stamping surface of the stamping tool into the colorant. Alternatively, the worker might apply colorant by brushing paint onto the stamping tool. As an example, a worker might hold the stamping tool at arm's length and spray a spray paint at the stamping surface of the stamping tool. The worker could select a colorant color that the worker has at hand. Alternatively, the worker could select a color that will be most visible against the surface to be stamped. The worker could select a color that carries a message, such as bright red when stamping a "DANGER" sign.

The method then moves to block 1709, where the worker extends the tape measure. Most tape measures contain more than ten feet of tape. The worker feeds out or spools in the tape measure tape to adjust the distance between the stamping tool and the worker. The worker, eyeing the location to be stamped, adjusts this distance until the stamping tool can reach the location to be stamped while the worker holds the tape measure case.

The method then moves to block 1711, at which the worker stamps the appropriate location. Here, the worker may adjust the worker's own position. Then, gripping the tape measure, the worker may rotate the tape measure to position the stamping tool near the appropriate location on the surface to be stamped. Finally, the worker shifts the tape measure case toward the surface to place the stamping surface of the stamping tool in contact with the surface at the appropriate location. When the worker withdraws the stamping tool, the tool will leave colorant on the surface. This produces a stamp.

Method 1700 of using a stamping tool further comprises corrective method 1750 in which the stamp placed at block 1711 indicates that an action is needed, and action is taken in response. For example, the worker may have stamped every spot on a ceiling surface where a fixture should be installed. A different construction worker using the stamp as an instruction or a note may then proceed to locate appropriate wiring and install a fixture at each spot marked. As another example, a supervisor may have stamped a defective component of the construction that should be replaced. A worker or tradesman may then act in reliance on the stamp by removing the offending component and replace it with a satisfactory one.

After the worker stamps the appropriate location in block 1711, project approval is withheld at block 1751, until the workers act on reliance on the stamp. Building codes and many construction contracts include requirements for certain types of construction work, styles of materials, and a minimum quality of the work. An inspector or supervisor inspecting work performed can use a stamping tool to stamp construction elements or locations where work is required or where work performed does not meet the requisite quality. By tying project approval to satisfactory completion of work in stamped location, the inspector or supervisor can ensure that workers know what is required of them for the building to receive an inspection certificate, or for the workers to receive payment under their contract.

At block 1753, a worker acts in reliance on the stamp. For example, a worker may correct a construction deficiency indicated by the stamp of an inspector, or a worker may place an electrical outlet at a location marked by a supervisor.

The method then moves to communicating step 1755, wherein a worker communicates the action taken on reliance on the stamp. Communicating step 1755 indicates to at least one individual that an action has been taken, and may comprise identifying the workers who took the action. Communicating step 1755 includes either block 1757, block 1759, or both block 1757 and 1759.

At block 1757, communicating step 1755 comprises placing a response stamp near the first stamp to indicate that action was taken. This response stamp may identify the action taken and/or the workers who took the action. This step allows workers to quickly ascertain where action was needed and taken in locations having a first stamp and a response stamp. The workers may also quickly ascertain where action is still required in locations having only the first stamp and not the response stamp. In some embodiments, the marking tools used for the first stamp and the response stamp are configured to distinguish a first stamp from a response stamp. Thus, a worker can more easily identify whether action was taken. For example, the first stamp may comprise a box and the response stamp a checkmark, such that when action has been taken, the first stamp and response stamp show a box and checkmark. In some embodiments, the first and second stamps can be a different style, can uniquely identify the parties stamping, can be of different colors, or the like.

As an example, a building inspector may have identified a need for a stamp where the construction workers have spaced wall studs too far apart to satisfy the building code. The building inspector may have attached a tape measure to a stamping tool that comprises a mark of identification of the inspector, a mark of dissatisfaction with the work done, a mark of identification of the corrective action needed, or some combination of those messages. The building inspector may place several stamps using different marking tools to indicate the need for corrective action. If the construction workers then act in reliance on the stamp by correctly placing another stud, a supervisor or the building inspector may then use a stamping tool to place a response stamp indicating that the work has been completed to satisfaction. In a later inspection, a worker seeing the first stamp and the response stamp may identify that corrective action was required and completed.

At block 1759, communicating step 1755 comprises recording the stamp and the action taken in reliance on the stamp. In some embodiments, recording the stamp and the action may comprise noting the stamp and the action in a logbook. For example, a worker might record that a supervisor stamped three locations for placing outlets, and that the workers installed three outlets. In some embodiments, recording the stamp and the action may comprise taking a photograph or video showing both the stamp and the results of the action taken in reliance on the stamp.

At block 1761, a worker determines whether the project has been performed to satisfaction. This may include comparing the original stamp made at an appropriate location according to block 1711 to the work performed. The worker may consider the response stamp placed according to block 1757, and/or the record of the stamp and action taken according to block 1759 in determining whether the project has been completed to satisfaction. For example, a photograph or video of the completed project and stamp can be sent to a supervisor or inspector. Because the stamp and the results of the action are both shown in the photograph or video, that supervisor or inspector can quickly identify what action was required, see what action was taken, and verify whether the action taken was satisfactory. If the project was not completed to satisfaction, the method returns to block 1751, and project approval is withheld again.

In another example, an inspector may use a stamping tool to stamp a location on a high wall where additional bracing was required, according to blocks 1703-1711. The stamp may identify the inspector and the fix required. Project approval is withheld according to block 1751. After workers have placed additional bracing according to block 1753, a worker can take a photograph of the new bracing and the stamp according to block 1759, and send it to the inspector.

Upon viewing the photograph, the inspector can quickly identify that the inspector had marked that spot as needing more bracing, view the bracing placed, and determine whether the new bracing is satisfactory according to block 1761.

Corrective method 1750 can be embodied in a mobile computing application which facilitates taking and distributing photographs to those who need to see the photograph, to take action, or to approve of an action taken. The application can interface with government or municipality systems for the supervisor to approve or sign-off on inspections after seeing the responsive stamps or work done. The inspectors can see images of their unique stamps along with responsive stamps and visible corrective actions, and be assured that the work is now done satisfactorily in order to issue the inspection certificate.

As described above, corrective method 1750 comprises block 1751, wherein project approval is withheld. This project approval may be withheld until the action taken upon reliance on a stamp has been communicated in communicating step 1755, and until a worker can determine if the project has been satisfactorily performed in block 1761. For example, a building inspector, having stamped construction elements in violation of the building code in accordance with block 1703 through 1711, may withhold occupancy approval in accordance with block 1751 until the violations are corrected. The building inspector may require the contractor submit evidence of satisfactory correction of each violation according to block 1753 before the inspector will issue an inspection certificate. The inspector may require the contractor to take and send a photograph of each stamped location via a mobile computing application, showing both the stamp made by the inspector and the corrective action taken according to block 1759. Because each photograph shows both the stamp and the corrective action, the inspector can quickly identify what action the inspector required with the stamp, inspect the corrective action for quality of work, and ensure that workers took corrective action at the appropriate location according to block 1761. This allows the inspector to determine whether an inspection certificate should be issued without needing to personally view the construction elements that were in violation.

Figure 18:
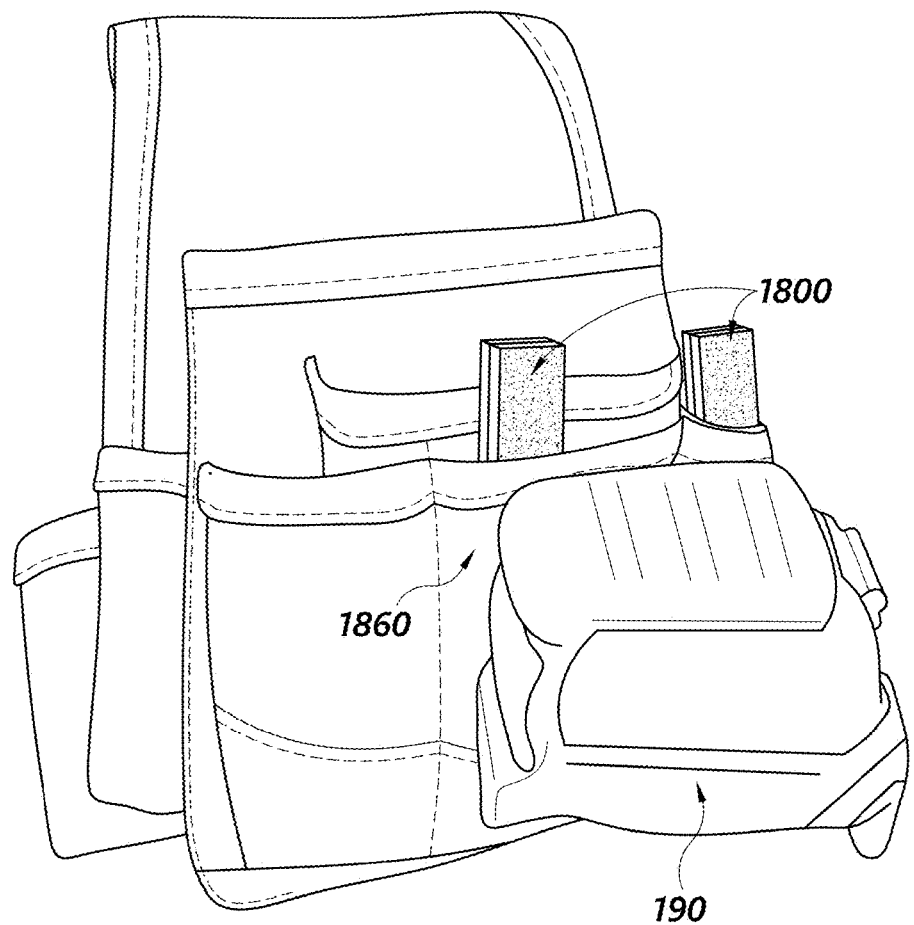
FIG. 18 shows example embodiments of a stamping tool stowed in a tool belt.

FIG. 18 depicts example embodiments of a stamping tool 1800 stowed in a tool belt. As shown, stamping tool 1800 can be securely stowed in the pocket of a worker's tool belt 1860. Tape measure 190 can be carried on the same toolbelt for convenient use with stamping tool 1800.

Although the following terms are believed to be well understood by one of skill in the art, the following definitions are set forth to facilitate understanding of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

As used herein, the terms "a" or "an" or "the" may refer to one or more than one. For example, "a" marker can mean one marker or a plurality of markers.

As used herein, the term "about," when used in reference to a measurable value such as an amount of mass, dose, time, temperature, and the like, is meant to encompass variations of 20%, 10%, 5%, 1%, 0.5%, or even 0.1% of the specified amount.

As used herein, the term "and/or" refers to and encompasses any and all possible combinations of one or more of the associated listed items, as well as the lack of combinations when interpreted in the alternative ("or").

Throughout this specification, unless the context requires otherwise, the words "comprise," "comprises," and "comprising" will be understood to imply the inclusion of a stated step or element or group of steps or elements but not the exclusion of any other step or element or group of steps or elements.

As used herein, the term "consists essentially of" (and grammatical variants thereof), as applied to the compositions and methods of the present disclosure, means that the compositions/methods may contain additional components so long as the additional components do not materially alter the composition/method. The term "materially alter," as applied to a composition/method, refers to an increase or decrease in the effectiveness of the composition/method of at least about 20% or more. For example, a component added to a composition of the present disclosure would "materially alter" the composition if it increases or decreases the composition's ability to inhibit tumor growth by at least 20%.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A marking tool configured to selectively couple to a tape measure, comprising:
    a coupling component comprising:
        a body;
        a cavity disposed within the body;
        a recess adapted to receive a hook portion of a tape measure;
        a magnet disposed within the cavity, wherein the magnetic field of the magnet is configured to interact with the hook portion of the tape measure when the hook portion of the tape measure is inserted in the recess;
    an applicator comprising a marking surface, the applicator configured to carry a colorant, the applicator adapted to make a mark on a surface at a distance from the tape measure when the tape measure is at least partially extended; and
    wherein the marking tool has an extension axis in the direction of the extension of the tape measure tape when the marking tool is coupled to the tape measure, and the marking tool has a concave axis in the direction of convexity of the tape measure tape, perpendicular to the extension axis, when the marking tool is coupled to the tape measure.

2. The marking tool of claim 1, wherein the recess comprises a hook recess in the shape of a slot, and is sized and shaped to receive a metal hook of a tape measure.

3. The marking tool of claim 2, wherein the recess further comprises a tape recess with the concave shape of the tape measure tape, the tape recess sized and shaped to receive a portion of the tape of the tape measure, and wherein the tape recess comprises an opening in a bottom surface of the coupling component, the bottom surface facing the direction opposite the extension axis.

4. The marking tool of claim 3, wherein the coupling component comprises a rear surface facing the direction of the concave axis, the rear surface comprising the recess.

5. The marking tool of claim 4, wherein the marking surface of the applicator faces substantially parallel to the extension axis.

6. The marking tool of claim 4, wherein the marking surface of the applicator is angled at 10° to 45° relative to the extension axis of the tape measure tape.

7. The marking tool of claim 1, wherein the marking tool further comprises a center mark placed at or near a center plane of the marking tool, and offset marks placed at an offset from the center plane of the marking tool.

8. The marking tool of claim 7, wherein the center mark and offset marks are placed on a front surface of the coupling component, the front surface facing the direction opposite to the concave axis.

9. The marking tool of claim 1, wherein the cavity opens to a bottom surface of the coupling component, the bottom surface facing the direction opposite the extension axis.

10. The marking tool of claim 1, wherein the cavity opens to a top surface of the coupling component, the top surface facing the direction of the extension axis, and the applicator covers the cavity.

11. The marking tool of claim 1, wherein the marking surface comprises a rear edge farthest along the concave axis, and wherein the rear edge does not substantially project past edges of the tape of the tape measure along the concave axis when the marking tool is coupled with a tape measure.

12. The marking tool of claim 1, wherein the marking surface comprises a rear edge farther along the concave axis, and wherein the rear edge substantially projects past edges of the tape of the tape measure along the concave axis when the marking tool is coupled with a tape measure.

13. The marking tool of claim 1, wherein the magnet has an elongated bar shape with an elongated direction, and the cavity orients the magnet such that the elongated direction is perpendicular to both the extension axis and the concave axis.

14. The marking tool of claim 1, wherein the magnet has an elongated bar shape with an elongated direction, and the cavity orients the magnet such that the elongated direction is parallel to the concave axis and perpendicular to the extension axis.

15. The marking tool of claim 1, further comprising:
an engagement feature disposed on the coupling component; and
a cover sized and shaped to shield at least a portion of the marking tool including the applicator, the cover comprising a corresponding engagement feature configured to selectively couple to the engagement feature disposed on the coupling component and maintain the cover in place shielding the portion of the marking tool.

16. The marking tool of claim 1, further comprising a pointed marking surface disposed along the concave axis, configured to produce a mark of variable size and shape depending on the force between the pointed marking surface and another surface which it contacts.

17. The marking tool of claim 1, wherein the marking surface is shaped to imprint a mark comprising a message such as a letter, symbol, or word.

18. The marking tool of claim 1, wherein the cavity is in communication with the recess, and where the magnet further comprises a tab projecting toward the recess, the tab sized and shaped to be received by a hook slot in the metal hook of the tape measure when the marking tool is coupled to the tape measure.

19. A stamping tool, comprising:
an applicator; and
a magnet affixed to the applicator configured to selectively couple the stamping tool to a hook of a tape measure.

20. A method for leaving a stamp at a distant surface, the method comprising:
identifying a need for a stamp at a distant surface;
attaching a stamping tool comprising an applicator and a magnet to a hook of a tape measure;
applying colorant to the applicator;
extending the tape measure proximate a surface;
contacting the applicator to the surface with the tape measure extended; and
moving the tape measure to press the applicator to the distant surface to apply at least a portion of the colorant to the surface.

* * * * *